US012745791B2

(12) United States Patent
Dubief et al.

(10) Patent No.: US 12,745,791 B2
(45) Date of Patent: Sep. 29, 2026

(54) METHOD FOR ROASTING COFFEE BEANS

(71) Applicant: SOCIETE DES PRODUITS NESTLE S.A., Vevey (CH)

(72) Inventors: Flavien Florent Dubief, Champagne (CH); Nicolas Bigler, Morrens (CH)

(73) Assignee: Societe des Produits Nestle S.A., Vevey (CH)

( * ) Notice: Subject to any disclaimer, the term of this patent is extended or adjusted under 35 U.S.C. 154(b) by 958 days.

(21) Appl. No.: 17/758,729

(22) PCT Filed: Jan. 14, 2021

(86) PCT No.: PCT/EP2021/050706

§ 371 (c)(1),
(2) Date: Jul. 13, 2022

(87) PCT Pub. No.: WO2021/144368

PCT Pub. Date: Jul. 22, 2021

(65) Prior Publication Data

US 2023/0046466 A1 Feb. 16, 2023

(30) Foreign Application Priority Data

Jan. 15, 2020 (EP) ..................................... 20152009

(51) Int. Cl.
*A23N 12/12* (2006.01)
*A23F 5/04* (2006.01)

(52) U.S. Cl.
CPC .............. *A23N 12/125* (2013.01); *A23F 5/04* (2013.01)

(58) Field of Classification Search
CPC ................................ A23N 12/125; A23F 5/04
(Continued)

(56) References Cited

U.S. PATENT DOCUMENTS 3,634,094 A 1/1972 Ponzoni et al.
7,285,300 B1 10/2007 Allington et al.
(Continued)

FOREIGN PATENT DOCUMENTS

CN 105939643 A 9/2016
CN 109480313 A 3/2019
(Continued)

OTHER PUBLICATIONS

Russian Office Action for Appl No. 2022119291/10 dated Apr. 27, 2024, 11 pages.

(Continued)

*Primary Examiner* — Brent T O'Hern
(74) *Attorney, Agent, or Firm* — K&L Gates LLP

(57) ABSTRACT

The invention concerns a method to determine the roasting recipe for roasting a customised blend of coffee beans introduced in a chamber of a roasting apparatus, said recipe providing the temperature to be applied at discrete successive times, said method comprising the steps of: obtaining for each type of coffee beans comprised in said blend at least: the type of said type of coffee beans, and the quantity of said type of coffee beans introduced in the chamber, and based on the obtained type, getting access at least to: roasting recipes of the different types of coffee beans and temperature adaptation factors of said different types of coffee beans of the customised blend, and based on the obtained quantities of the different coffee beans and the accessible roasting recipes and temperature factors, determining the roasting recipe to be applied to said customised blend of coffee beans introduced inside the chamber.

11 Claims, 8 Drawing Sheets

(58) Field of Classification Search
USPC .......................................................... 426/595
See application file for complete search history.

(56) References Cited

U.S. PATENT DOCUMENTS

| | | | |
|---|---|---|---|
| 2004/0074400 A1 | 4/2004 | Song | |
| 2004/0142078 A1 | 7/2004 | Eichner | |
| 2006/0266229 A1 | 11/2006 | Ribich | |
| 2012/0265364 A1 | 10/2012 | Zambrano | |
| 2014/0314923 A1* | 10/2014 | Sewell | A23N 12/08 426/233 |
| 2018/0255802 A1 | 9/2018 | Yamamoto | |

FOREIGN PATENT DOCUMENTS

| | | | |
|---|---|---|---|
| DE | 102007017385 | A1 | 11/2008 |
| EP | 0405649 | | 1/1991 |
| GB | 2355642 | A | 5/2001 |
| GB | 2388763 | | 11/2003 |
| IE | 930664 | A1 | 3/1995 |
| JP | 2009268428 | A | 11/2009 |
| JP | 6190929 | B1 | 8/2017 |
| JP | 2019503647 | A | 2/2019 |
| KR | 101786530 | B1 | 10/2017 |
| KR | 101892441 | B1 | 8/2018 |
| KR | 101904691 | | 11/2018 |
| RU | 2647611 | C2 | 3/2018 |
| RU | 2706189 | C2 | 11/2019 |
| WO | 0167880 | A2 | 9/2001 |
| WO | 2006034203 | | 3/2006 |
| WO | 2016083148 | A1 | 6/2016 |
| WO | 2017178393 | | 10/2017 |
| WO | 2018007690 | | 1/2018 |
| WO | 2018021081 | A1 | 2/2018 |

OTHER PUBLICATIONS

Japanese Office Action for Appl No. 2022-541005 dated Sep. 24, 2024, 4 pages.

Chinese Office Action for Appl No. 202180008080.3 dated Jul. 12, 2025, 7 pages.

Japanese Office Action for Appl No. 2022-541005 dated Jun. 24, 2025, 3 pages.

Chinese Office Action for Appl No. 202180008080.3 dated Oct. 20, 2025, 4 pages.

* cited by examiner

METHOD FOR ROASTING COFFEE BEANS

CROSS REFERENCE TO RELATED APPLICATIONS

The present application is a National Stage of International Application No. PCT/EP2021/050706, filed on Jan. 14, 2021, which claims priority to European Patent Application No. 20152009.5, filed on Jan. 15, 2020, the entire contents of which are being incorporated herein by reference.

FIELD OF THE INVENTION

The present invention relates to the roasting coffee beans and more specifically to the roasting of blends of different coffee beans, particularly suited for use in the home or in shops and cafes.

BACKGROUND OF THE INVENTION

For the last decades, numerous roasters have been developed for use in the home or in small shops and coffees. Most of these roasters implement automatic roasting processes with roasting profiles stored or accessible by the control unit of the apparatus.

These apparatuses are usually configured to apply roasting profiles each dedicated to specific types of coffee beans. Each roasting profile guarantees an optimal roasting of this specific type of coffee beans. Usually these roasting profiles are pre-determined by experts in roasting. These pre-determined roasting profiles enable operators to roast automatically the corresponding coffee beans with no risk of spilling the beans.

Today, there is a trend to produce customized roasted beans, in particular by roasting blends of different types of coffee beans. For example, blends can comprise different coffee beans differing by their origins and/or botanical varieties like a blend of *Arabica* and *Robusta* coffee beans, or the blend can comprise different coffee beans of same origin or same variety but produced by different farmers. In addition, these blends can present different proportions of each type of coffees.

The roasting parameters defined as optimal for one type of coffee beans of the blend may adversely affect another type of coffee beans of the blend. Some types of beans can become burnt whereas, for others, the desired degree may not be reached or the beans may not be uniformly roasted, or may not provide the optimal sensory profile.

Trying to determine the best roasting profile of a blend is not so straight forward: the operator needs to test different roasting profiles before good results are reached, which requires time and can produce important waste of beans.

An existing solution consists in roasting each type of beans separately and then to mix the different roasted beans to form the final blend (method called “split roasting”). This method can be implemented with blends comprising two different types of beans, but when the blend comprises more than two types of beans, the method becomes too time consuming and complicated to be implemented. In addition the method requires the storage of each types of roasted beans during the roasting operation of the other types of beans, which is not practical at home or in small shops and cafés.

SUMMARY OF THE INVENTION

An object of the present invention is to improve the automatic roasting of coffee beans.

It would be advantageous to provide a roasting apparatus enabling optimal roasting whatever the blend of beans to roast.

It would be advantageous to provide a roasting apparatus applying automatically the roasting profile corresponding to the quantity of a blend of beans introduced in the apparatus.

Objects of the invention are achieved by the method to determine the roasting recipe for roasting a customised blend of coffee beans disclosed herein, the roasting apparatus disclosed herein, the computer program disclosed herein and the computer readable storage medium disclosed herein.

In a first aspect, there is provided a method to determine the roasting recipe $R_{blend}$ for roasting a customised blend of coffee beans $C_A$, $C_B$, . . . introduced in a chamber of a roasting apparatus, said recipe $R_{blend}$ providing the temperature T@t1, T@t2, . . . to be applied at discrete successive times $t_1$, $t_2$, . . . , respectively, said method comprising the steps of:

- obtaining for each type of coffee beans $C_n$ comprised in said blend at least:
  - the type $C_n$ of said type of coffee beans, and
  - the quantity $m_n$ of said type of coffee beans $C_n$ introduced in the chamber, and
- based on the obtained type $C_n$, getting access at least to:
  - roasting recipes $RM_A$, $RM_B$, . . . of the different types of coffee beans $C_A$, $C_B$, . . . respectively of the customised blend, each recipe $RM_n$ being adapted to the roasting of one pre-determined quantity $M_n$ of beans of same type $C_n$ and providing the temperatures $TM_n@t_i$ to be applied at discrete successive times $t_i$ respectively, and
  - temperature adaptation factors $K_A$, $K_B$, . . . of different types of coffee beans $C_A$, $C_B$, . . . respectively of the customised blend, and
- based on the obtained quantities $m_n$ of the different coffee beans $C_n$ and the accessible roasting recipes $RM_n$ and temperature factors $K_n$, determining the roasting recipe $R_{blend}$ to be applied to said customised blend of coffee beans introduced inside the chamber.

The roasting operation is generally implemented in a roasting apparatus comprising a chamber to contain coffee beans during the roasting process. In the chamber coffee beans are heated and preferably mixed to homogenise heating through the beans.

Mixing can be obtained with a fluidic bed of hot air or mechanically with stirring blades or through rotation of a rotating drum.

Preferably the chamber is hot air fluid bed chamber. Within such a chamber, heated air is forced through a screen or a perforated plate under the coffee beans with sufficient force to lift the beans. Heat is transferred to the beans as they tumble and circulate within this fluidized bed.

Alternatively the chamber can be a drum chamber wherein the coffee beans are tumbled in a heated environment. The drum chamber can consist of a horizontal rotating drum or the drum chamber can comprise stirring blades to tumble the coffee beans in a heated environment.

The roasting apparatus comprises a device to heat coffee beans contained in the chamber Preferably, the heating device is configured to produce a flow of hot air, said flow of hot air being directed to the coffee beans contained in the chamber in order to heat them. Usually, the heating device comprises at least an air driver and a heater to heat the flow of air produced by the air driver.

As a source of heat, preferably the apparatus comprises an electrical heater. This electrical heater is usually an electrical resistance. An electrically powered source of heat presents the advantage that the air pollutants produced during the roasting are pollutants generated from the heating of coffee beans themselves and not from the burning of gases as it happens when the source of heating is a gas burner using natural gas, propane, liquefied petroleum gas (LPG) or even wood.

The apparatus comprises a control system operable to control the heating device and the control system is configured to apply a roasting recipe. This roasting recipe R provides the temperature $T_{@t1}$, $T_{@t2}$, $T_{@tfinal}$ to be applied at discrete successive times $t_1$, $t_2$, . . . , $t_{final}$ respectively of the roasting process. This roasting recipe is usually represented as a temperature versus time profile.

Usually, this control is implemented based on the measure of at least one temperature sensor positioned in or at the inlet of the chamber in feedback loop control.

Control is applied on the heating device, such as the heater and/or on the air driver.

When a customized blend of different of at least two different coffee beans $C_A$, $C_B$, . . . is introduced inside the chamber within respective quantities $m_A$, $m_B$, . . . , the present method enables the determination of the roasting recipe $R_{blend}$ adapted for this specific blend.

By customised blend, it is meant a blend of different coffee beans of single origins and/or different pre-existing coffee blends. The new customised blend is created by the operator of the apparatus; no roasting recipe has been previously determined for this new customised blend and is accessible by the control system.

With the present apparatus, in the case of such a new customised blend, the control system of the apparatus is configured to determine a roasting profile adapted to said new customised blend.

For a customised blend of different coffee beans ($C_A$, $C_B$, . . . ), the method comprises the first step of obtaining, for each type of coffee beans $C_n$ comprised in said blend at least:

- the type $C_n$ of said type of coffee beans, and
- the quantity $m_n$ of said type of coffee beans $C_n$ introduced in the chamber.

The quantity can be the weight or alternatively the volume or the level of coffee beans present in the chamber of the roasting apparatus. Preferably the quantity is the weight.

Usually, the type $C_n$ of the beans relates to at least one feature of the beans which has the direct impact on the process of roasting the beans.

The type of coffee beans can relate to specific features such as:

- the origin of the beans and/or the botanical variety of the beans (*Arabica, Robusta*, . . . ) or a particular pre-existing mixture or blend of different beans; the pre-existing mixture or blend can be defined by the selection of different specific beans and/or by the ratio of these different specific beans.
- the level of pre-roasting of the beans. The coffee beans to be roasted can be green beans or can be partially pre-roasted beans that is beans having been obtained by heating green coffee beans and stopping said heating process before the end of the first crack. These partially pre-roasted beans can be pre-roasted at different levels with a direct impact on the subsequent final roasting operated in the roasting apparatus.
- the moisture of the beans,
- the size of the beans.

The types of beans can refer explicitly to the nature of the beans like the origin, the botanical variety, the blend, the level of pre-roasting, . . . and/or can be a reference like an identification number, a SKU number or a trademark.

When the method is applied in a roasting apparatus, the type of beans $C_n$ can be obtained by different ways:

- from the user. In that case, the user interface of the apparatus can display a list of types of beans and urge the user to select the types she/he is introducing inside the chamber.

Alternatively, this list can be displayed through the interface of a mobile device configured to communicate with the control system of the apparatus.

or

- from a code, such as a code provided on a beans package. In that case, the apparatus can comprise a code reader and the control system can be configured to urge the operator to scan the code of the beans (for example provided on the beans package) she/he is introducing inside the chamber.

When the method is applied in a roasting apparatus, the quantity $m_n$ of each type of coffee beans $C_n$ part of the blend introduced in the chamber can be obtained:

- from the user. In that case, the apparatus can comprise a user interface to enable the user to enter the quantity of each type of beans she/he is introducing inside the chamber. Again, this quantity can be entered through the interface of a mobile device configured to communicate with the control system of the apparatus.

or

- from a measuring device connected to the control system of the apparatus. In that case, the measure of the quantity $m_n$ of the beans can be automatically provided to the control system of the apparatus.

The apparatus can comprise a measuring device configured to measure the quantity $m_n$ of beans $C_n$ introduced in the chamber and, in the step of supplying the controller with the quantity $m_n$ of coffee beans, said quantity of coffee beans can be automatically measured by the measuring device and supplied to the control system of the apparatus.

In one embodiment, the chamber of the apparatus can be transparent and the wall of the chamber can present level indicators readable by the operator.

Consequently, when the operator introduces the beans in the transparent chamber, he/she is able to read the introduced quantity by looking at the level indicator. This information can then be entered as an input inside the control system of the apparatus, for example through a user interface.

According to one embodiment, the apparatus can comprise the measuring device configured to measure the quantity $m_n$ of beans introduced in the chamber and, in the step of supplying the controller with the quantity $m_n$ of coffee beans, said quantity of coffee beans can be automatically measured by the measuring device and supplied to the control system of the apparatus.

The measuring device can be:

- a scale measuring weight of coffee beans, or
- a device comprising at least one cavity of predetermined volume, or
- a level sensor measuring a volume of coffee beans inside the chamber.

Preferably, this quantity is the weight and the measuring apparatus is a weight scale.

When the measuring device is a device comprising at least one cavity of predetermined volume, this device enables the user to select a cavity of predetermined volume and to fill this cavity completely with beans with the result that a defined volume of beans is measured. The control system of the roasting apparatus is provided with this precise volume of beans.

When the measuring device is a level sensor, this sensor measures a volume of coffee beans inside the chamber. The process control is configured to deduce the volume of beans from said measured level.

If it is the volume of beans that is measured then, based on an identification of the type of the beans, their density can be obtained, and accordingly their precise weight can be deduced.

According to another embodiment, the apparatus can comprise:

at least two containers to store different types $C_n$ of coffee beans, at least one dosing device to dose and supply coffee beans from the containers to the chamber, and, in the step of obtaining the quantity $m_n$ of each type $C_n$ of beans introduced in the chamber, the quantity of dosed coffee beans of each type $C_n$ can be automatically supplied to the control system.

In a particular embodiment, the apparatus can comprise an identification device configured to read identification means from a beans package, said beans package being configured to supply the chamber of the apparatus with its whole content, and said identification means providing directly or indirectly the quantity $m_n$ of beans inside the package in addition to the type of beans $C_n$.

Based on the obtained type $C_n$ of the different types of coffee beans $C_A$, $C_B$, . . . part of the customised blend, the method comprises the step of getting access at least to:

roasting recipes $RM_A$, $RM_B$, . . . of said coffee beans $C_A$, $C_B$, . . . respectively part of the customized blend, each recipe $RM_n$ being adapted to the roasting of one pre-determined quantity $M_n$ of beans of same type $C_n$ and providing the temperatures $TM_n@t_i$ to be applied at discrete successive times $t_i$ respectively, and temperature adaptation factors $K_A$, $K_B$, . . . of said coffee beans $C_A$, $C_B$, . . . respectively part of the customized blend.

When the method is implemented in a roasting apparatus, these roasting recipes and temperature adaptation factors can be stored in a database or memory accessible to the control system of the apparatus. Further to the step of obtaining the type $C_n$ of the beans part of the customised blend, the control system can be configured to get access to the roasting recipe $RM_n$ and temperature adaptation factor $K_n$ of each identified coffee beans part of the customised blend.

In an alternative embodiment, the type, the roasting recipe for one pre-determined quantity and the temperature adaptation factor of each type of beans can be encoded in a code identifying each beans part of the blend. By the single step of reading the code of the beans, the control system can be configured to obtain the identification and get access to the roasting recipe and the temperature factor.

Each accessible roasting recipe $RM_n$ is adapted for a specific type $C_n$ of coffee beans (or a specific blend of different types of coffee beans as mentioned below) and for a pre-determined quantity $M_n$ of said beans. This pre-determined quantity can be set to correspond to a point between the minimum quantity and the maximum quantity able to be roasted inside the chamber of the roasting apparatus. Accordingly, for one type of beans, at least one roasting recipe adapted to the roasting of said pre-determined quantity $M_n$ is accessible to the control system.

Preferably, this step provides access to the pre-determined quantity $M_n$ associated to the roasting recipe $RM_n$ too. In one embodiment, this pre-determined quantity can be the same for all the accessible roasting recipes $RM_n$ and this pre-determined quantity can be stored by the control system of the apparatus. In another embodiment, this pre-determined quantity can be different according to the coffee beans $C_n$ and its roasting recipe $RM_n$. In that latter case, the control system is configured to get access to said pre-determined quantity $M_n$ associated to the respective roasting recipe $RM_n$ too.

These different roasting recipes adapted to the roasting of pre-determined quantities of one type of beans are usually defined by experimentation. Preferably, the roasting recipe is linked also to the type of roasting apparatus itself such as the type of type of agitation of the beans (fluidic bed or rotating drum), the internal design like the shape of the chamber, the position of the components (e.g. the temperature sensor) and/or such as the types of components like the nature of the heating device.

In addition, the method comprises the step of getting access to temperature adaptation factors $K_A$, $K_B$, . . . of the different types of coffee beans $C_A$, $C_B$, . . . respectively too.

Then, based on the obtained quantities $m_n$ of the different coffee beans $C_n$ part of the customised blend and on the accessible roasting recipes $RM_n$ (and preferably the quantity $M_n$) and on the temperature factors $K_n$ of the different coffee beans $C_n$ part of the customised blend, the method comprises the step of determining the roasting recipe $R_{blend}$ to be applied to said customised blend of coffee beans introduced inside the chamber.

Advantageously objects of the invention are solved since the above features enables the control of the roasting apparatus to apply a roasting profile that takes into account the type and the quantity of each coffee beans used in the customized blend introduced inside the apparatus to guarantee that, whatever the quantities and types, the beans are correctly roasted. In particular, the new roasting profile can be derived from existing pre-established roasting recipes of each type of coffee beans part of the blend, the new roasting recipe of the blend becoming an average of all these pre-established roasting recipes.

In one embodiment, the determined roasting recipe $R_{blend}$ can be stored and optionally shared in case the customised blend is prepared once again Preferably, the roasting recipe $R_{blend}$ to be applied on the customised blend of coffee beans is determined by implementing at least the following steps:

for each type $C_n$ of coffee beans respectively:

selecting or determining the roasting recipe $Rm_n$ adapted to the roasting of the obtained quantity $m_n$ of beans of said obtained type $C_n$, said roasting recipe $R_n$ providing the temperatures $Tm_n@t_i$ respectively to be applied at time $t_i$ respectively, and from said selected and/or determined roasting recipes $Rm_n$ and from said accessible temperature adaptation factors $K_n$, and based on the obtained quantities $m_n$ of beans of type $C_n$ introduced inside the chamber, determining the temperature $T_{blend@t1}$, $T_{blend@t2}$, to be applied to the customised blend of beans at each of said discrete successive times $t_1$, $t_2$, . . . according to following formula (I):

$$T_{blend@t_i} = \sum_{n=A}^{N} f_n \cdot K_n \cdot T_{m_n@t_i} \quad (I)$$

wherein n corresponds to all the types of coffee beans $C_A$ to $C_N$ present in the blend and $f_n$ represents the fraction in weight of coffee beans of type $C_n$ in the customised blend of coffee beans.

In this preferred embodiment, the roasting recipe of the blend is determined based on a previous step of selection and/or determination of roasting recipes that have been selected or determined to correspond to the specific weight $m_n$ of coffee beans $C_n$ introduced in the chamber.

By selection, it is meant that the accessible roasting recipe corresponding to one type and one quantity of coffee beans present in the blend is selected. In particular, by getting access to a memory or database that stores a collection of roasting recipes for different quantities for each type of coffee beans, one of these roasting recipes can be selected and then used to determine the roasting recipe of the blend.

By determination, it is meant that the roasting recipe corresponding to one type and one quantity of coffee beans present in the blend can be calculated. In particular, by getting access to a memory or database that stores at least one roasting recipe corresponding to one type of coffee beans and one quantity of said coffee beans and, from said at least one recipe, other roasting recipes for other quantities of said type of coffee beans can be calculated. Then, this calculated recipe can be used to determine the roasting recipe of the blend.

Depending on the type of accessible roasting recipes for each type of beans part of the blend, the roasting recipe $R_{blend}$ can be determined from selected and/or determined roasting recipes, part of the recipes having been selected, whereas other part of the recipes having been determined.

The selection of the roasting recipes adapted to the roasting of the specific coffee beans part of the blend and for the specific quantity of said beans part of the blend provides a good starting point to calculate the roasting recipe of the blend.

In addition, the formula (I) uses these selected roasting recipes with a quantity factor $f_n$ which is able to take into account the presence of a greater part of one type of beans $C_n$ inside the blend.

In addition the formula (I) uses these selected roasting recipes with a temperature adaptation factor $K_n$ which enables to provide more or less importance to the roasting profile of one of the type of beans in the roasting profile of the blend. This factor takes into account, among other aspects, of the capacity of the respective beans $C_n$ to absorb heat, which can vary with the size of this bean, its density, its internal structure and/or its chemical composition. For example two types of beans can differ by their sizes, as a result, less heat energy is required for the smaller. This factor can take into account a particular desired property of these beans once roasted in the blend, this desired property can relate to the colour of the roasted beans, its level of acrylamide and/or its sensory profile in the final roasted blend.

Actually, due to the fact that the blend comprises different types of beans presenting different reactions further to the implementation of a common roasting profile, the final roasted blend may comprise roasted beans presenting different colours and/or different levels of specific components like acrylamide or furan generated by roasting and/or different optimal sensory profile. In order to control the production of roasted blends presenting all or some of these properties, temperature adaptation factor are used to keep specific coffee beans, in particular the more sensitive, closer to their respective roasting profile in order to obtain the desired properties of these beans.

For different beans, the key criteria for defining the temperature adaptation factor can be different since some beans may be more or less sensitive to deviation from their optimal roasting profile.

Usually, when a blend is created, it is expected to produce a resulting roasted blend presenting properties corresponding globally to an average of the properties of each types of beans roasted separately in particular the best properties of each of these beans. The temperature adaptation factor guarantees that the properties of the beans that are the more sensitive to temperature will be found in the roasted blend.

The value of the temperature adaptation factor $K_n$ is usually comprised between 0,5 and 2. Factors with low value are adapted to beans being less sensitive to temperature variation whereas factors with high value are adapted to more reactive beans that develop new properties if roasted at temperatures too much different from their optimal roasting profile. These factors are usually defined by experimentation.

The formula enables the automatic calculation of the roasting recipe of the blend. A non-experimented operator becomes able to roast a blend of different types of coffee without risk that the resulting roasted blend presents a poor taste profile, in particular is burnt or not roasted enough. The risk the beans are wasted is prevented.

Interpolation of Roasting Profiles

If, in at least two of the selected or determined roasting recipes $Rm_n$ of coffees $C_n$, the recipes providing temperatures $Tm_n@t_i$, to be applied at discrete successive times $t_i$, at least a part of the discrete successive times t are set differently, then from the selected or determined roasting recipes $Rm_n$ for each coffee $C_n$ of the customised blend, interpolated roasting recipes curves $Rm_n$ can be determined by interpolating the curves of the accessible roasting recipes so that all the selected or determined roasting recipes provide the temperatures $T_{m_n@t1}$, $T_{m_n@t2}$, $T_{m_n@tfinal}$, respectively to be applied at the same discrete successive times $t_1, t_2, \ldots t_{final}$.

A coffee roasting recipe is frequently provided as a list of discrete points, each being defined by its time and its temperature, rather than as continuous curve. It can happen that the control system of the apparatus gets access to roasting recipes for different types of coffee beans and weight of said beans and that these roasting recipes provide discrete points for different set times.

In order to be able to determine the roasting recipe of the blend according to above formula (I), for all the roasting recipes previously determined for each types of coffee beans part of the blend and for the weight of said type of coffee beans in the blend, corresponding interpolated recipes can be determined so that all these interpolated recipes provide a list of discrete pairs of time and temperature for the same times.

Usually, in that operation of interpolation of the different curves, specific discrete successive times $t_1, t_2, \ldots t_{final}$ are pre-defined and new interpolated roasting recipes curves $Rm_n$ are determined from the accessible roasting recipes for each of these pre-defined specific discrete successive times $t_1, t_2, \ldots t_{final}$.

These pre-defined specific discrete successive times $t_1, t_2, \ldots t_{final}$ can be times pre-defined at regular intervals during a maximum time period (usually the greater $t_{final}$ of the selected curves) or they can be times pre-defined at specific critical periods of a roasting profile, for example during the period of first crack generation.

The advantage of the interpolation operation is that different roasting recipes of various types of beans can be accessed to and still be used whatever their format in terms of times as the abscissa. In particular, roasting profiles defined by different roasting specialists measuring temperature at different time abscissa can be stored and become accessible whatever their format since the interpolation operation enables the use of said new curve with all other accessible ones.

Determination of Blend Roasting Profile from Roasting Profiles Having Different Tfinal.

In addition or independently from the above embodiment, in another embodiment the method can comprise the steps of:

selecting or determining:

the roasting recipes $Rm_A$, $Rm_B$, $Rm_n$, . . . of the different identified types of coffee beans of different types $C_A$, $C_B$, . . . $C_n$ . . . respectively, each recipe being adapted to the roasting of the quantity $m_n$ of beans of same type $C_n$ and providing the temperatures $Tm_{n@}ti$ to be applied at discrete successive times $t_i$ up to a final time tfinal n respectively, and said final time $t_{final\ n}$ being set differently in at least two of said different roasting recipes $Rm_A$, $Rm_B$, $Rm_n$ . . . , and getting access to:

time adaptation factors $S_A$, $S_B$, . . . $S_n$ for each type of coffee beans $C_A$, $C_B$, . . . $C_n$ respectively, and determining the roasting recipe ($R_{blend}$) to be applied on the blend of coffee beans by implementing the following steps:

based on the obtained roasting recipes $Rm_A$, $Rm_B$, . . . $Rm_n$, . . . , obtaining the final times $t_{final\ y}$ of all the coffees $C_n$ part of the customised blend, sorting said obtained final times $t_{final\ y}$ in an ascending order from the smallest final time $t_{final\ low}$ up to the highest $t_{final\ high}$ for times inferior or equal to the smallest final time $t_{final\ low}$, determining the roasting recipe ($R_{blend}$) to be applied to said blend of coffee beans introduced inside the chamber according to formula (I), for times superior to the smallest final time $t_{final\ low}$, determining the roasting recipe $R_{blend}$ to be applied to said blend of coffee beans introduced inside the chamber by setting temperatures to be applied at calculated times $t_y$, each of said calculated times $t_y$ being calculated from each corresponding obtained final time $t_{final\ y}$, from $t_{final\ low}+1$ up to $t_{final\ high}$, as follows:

$t_y = t_{final\ y-1} + [(t_{final\ y} - t_{final\ y-1}) * \Sigma(f_{n'} * S_{n'})]$ with $n'$ corresponding to the coffees presenting a final time superior or equal to $t_{final\ y}$, up to $t_{final\ high-1}$, temperature being determined at each of said calculated time $t_y$ from the roasting recipes $Rm_{n'}$ of all the coffee beans $C_{n'}$, presenting a final time superior or equal to $t_{final\ y}$, according to following formula (II):

$$T_{blend@t_y} = \sum_{n'} f_{n'} \cdot K_{n'} \cdot T_{m_{n'}@t_y} \quad \text{(II)}$$

at $t_{final\ high}$:

if only one coffee $C_z$ presents a roasting recipe that presents a final time equal to final high, then the temperature of the blend is the temperature of the roasting recipe of the quantity $m_z$ of said coffee $C_z$ part of the blend at said final time: $T_{blend@tfinal\ high} = TM_{z@tfinal\ z}$, or if at least two coffees presents roasting recipes that present the same final time equal to $t_{final\ high}$, then the temperature of the blend is determined according to formula (II).

Preferably, $Tm_{n'}@t_y$ corresponds to interpolated values extracted from the recipes $Rm_{n'}$.

The advantage of this last embodiment is that it is possible to get access to any type of format of roasting profile, in particular there is no need to keep the profile in specific time limits.

Alternatively to the previous embodiment, the method can comprise the steps of:

selecting or determining the roasting recipes $Rm_A$, $Rm_B$, . . . $Rm_n$ of the different identified types of coffee beans of different types $C_A$, $C_B$, . . . $C_n$ respectively, each recipe being adapted to the roasting of the quantity $m_n$ of beans of same type $C_n$ and providing the temperatures $Tm_{n@}ti$ to be applied at discrete successive times t up to a final time $t_{final\ n}$ respectively, and said final time $t_{final\ n}$ being set differently in at least two of said different roasting recipes $Rm_A$, $Rm_B$, . . . $Rm_n$ . . . , and determining the roasting recipe ($R_{blend}$) to be applied on the blend of coffee beans by implementing the following steps:

based on the selected or determined roasting recipes $Rm_A$, $Rm_B$, . . . $Rm_n$, obtaining the final times $t_{final\ n}$ of all the coffees $C_n$ part of the customised blend, and identifying the smallest final time $t_{final\ 1}$, limiting the roasting recipe ($R_{blend}$) to be applied to said blend of coffee beans introduced inside the chamber to times inferior to the smallest final time tfinal 1, and determining the roasting recipe ($R_{blend}$) to be applied to said blend of coffee beans introduced inside the chamber according to formula (I).

In that embodiment, the roasting recipe to be applied to the blend of coffee beans finishes at the final time of the beans presenting the smallest final time Sinai 1. As a result the risk of over-roasting the more fragile beans with this smallest final time Sinai 1 is limited.

In another alternative embodiment, the method comprises the step of:

selecting or determining the roasting recipes $Rm_A$, $Rm_B$, . . . $Rm_n$ of the different identified types of coffee beans of different types $C_A$, $C_B$, . . . $C_n$ . . . respectively, each recipe being adapted to the roasting of the quantity $m_n$ of beans of same type $C_n$ and providing the temperatures $Tm_{n@}ti$ to be applied at discrete successive times t up to a final time $t_{final\ n}$ respectively, and said final time $t_{final\ n}$ set differently in at least two of said different roasting recipes $Rm_A$, $Rm_B$, . . . $Rm_n$, and determining the roasting recipe ($R_{blend}$) to be applied on the blend of coffee beans by implementing the following steps:

based on the selected or determined roasting recipes $Rm_A$, $Rm_B$, . . . $Rm_n$, obtaining the final times tfinal n of all the coffees $C_n$ part of the customised blend, and identifying the smallest final time Sinai low, for times inferior or equal to the lowest final time $t_{final\ low}$, determining the roasting recipe ($R_{blend}$) to be applied to said blend of coffee beans introduced inside the chamber according to formula (I), for times superior to the smallest final time $t_{final\ low}$, determining the roasting recipe $R_{blend}$ to be applied to said blend of coffee beans introduced inside the chamber by setting temperatures to be applied at each $t_{final\ n}$ as follows:

up to $t_{final\ high-1}$, temperature being determined at each of said time $t_{final\ n}$ from the roasting recipes $Rm_{n'}$ of all the coffee beans $C_{n'}$ presenting a final time superior or equal to $t_{final\ y}$, according to following formula (II):

$$T_{blend@t_{final\,n}} = \sum_{n'} f_{n'} \cdot K_{n'} \cdot T_{m_{n'}@t_{final\,n}} \qquad \text{(II)}$$

at $t_{final\ high}$:

if only one coffee Cz presents a roasting recipe that presents a final time equal to $f_{inal\ high}$, then the temperature of the blend is the temperature of the roasting recipe of the quantity mz of said coffee Cz part of the blend at said final time: $T_{blend@final\ high}=Tm_{z@tfinal\ z}$, or if at least two coffees presents roasting recipes that present the same final time equal to $t_{final\ high}$, then the temperature of the blend is determined according to formula (II).

Preferably, $Tm_{n'}@t_{final\ n}$ corresponds to interpolated values extracted from the recipes $Rm_{n'}$.

In another alternative embodiment, the method comprises the steps of:

selecting or determining the roasting recipes $Rm_A$, $Rm_B$, . . . $Rm_n$ of the different identified types of coffee beans of different types $C_A$, $C_B$, . . . $C_n$ . . . respectively, each recipe being adapted to the roasting of the quantity $m_n$ of beans of same type $C_n$ and providing the temperatures $T_{mn@ti}$ to be applied at discrete successive times $t_i$ up to a final time $t_{final\ n}$ respectively, and said final time $t_{final\ n}$ set differently in at least two of said different roasting recipes $Rm_A$, $Rm_B$, . . . $Rm_n$, and getting access to time adaptation factors $S_A$, $S_B$, . . . $S_n$ for each type of coffee beans $C_A$, $C_B$, . . . $C_n$ respectively, and determining the roasting recipe ($R_{blend}$) to be applied on the blend of coffee beans by implementing the following steps:

based on the selected or determined roasting recipes $Rm_A$, $Rm_B$, . . . $Rm_n$, obtaining the final times $t_{final\ n}$ of all the coffees $C_n$ part of the customised blend, and identifying the smallest final time $t_{final\ low}$, for times inferior or equal to the lowest final time $t_{final\ low}$, determining the roasting recipe ($R_{blend}$) to be applied to said blend of coffee beans introduced inside the chamber according to formula (I), above the smallest final time $t_{final\ low}$, calculating one time $t_{final\ global}$ from all the final times $t_{final\ n}$ of all the coffees $C_n$ part of the customised blend, as follows:

$$t_{final\ global} = \sum\left(f_n * S_n * t_{final^n}\right)\right]$$

limiting the roasting recipe ($R_{blend}$) to be applied to said blend of coffee beans introduced inside the chamber to said time $t_{final\ global}$, and determining the temperature of the roasting recipe ($R_{blend}$) to be applied at said time $t_{final\ global}$ to said blend of coffee beans introduced inside the chamber from the roasting recipes $Rm_{n'}$ of all the coffee beans $C_{n'}$ presenting a final time superior or equal to tfinal global, according to following formula (II):

$$T_{blend@t_{final\,global}} = \sum_{n'} f_{n'} \cdot K_{n'} \cdot T_{m_{n'}@t_{final\,global}} \qquad \text{(II)}$$

Preferably, $Tm_{n'}@t_{final\ global}$ corresponds to interpolated values extracted from the recipes $Rm_{n'}$.

Determination of the Roasting Recipe $Rm_n$ from One Pre-Determined Roasting Recipe $RM_n$ In one first mode of the step of determining, for at least one coffee $C_n$, the roasting recipe $R_n$ adapted to the roasting of the obtained quantity $m_n$ of beans of said identified type $C_n$, the method comprises the steps of:

getting access, for at least one coffee $C_n$, to one roasting recipe $RM_n$ of coffee beans, said recipe being adapted to the roasting of one pre-determined quantity $M_n$ of beans, for said at least one coffee $C_n$ part of the customised blend, determining the roasting recipe $Rm_n$ adapted to the roasting of the obtained quantity $m_n$ of beans of said identified type $C_n$, (providing the temperatures $T_{m_n@t_i}$ respectively to be applied at time t respectively) from said one accessible recipe $RM_n$ adapted to the roasting of one pre-determined quantity $M_n$ of beans of type $C_n$ and providing the temperatures $T_{M_n@t_i}$ to be applied at discrete successive times $t_i$ respectively, as follows:

$$\cdot \text{ if } m_n > M_n, \text{ then } Tm_{n@ti} = T_{Mn@ti} + \left[TM_n @ ti \cdot D \cdot (m_n - M_n)/Mn\right] \qquad \text{(IIIa)}$$

$$\cdot \text{ if } m_n < M_n, \text{ then } Tm_{n@ti} = T_{Mn@ti} - \left[TM_n @ ti \cdot D \cdot (M_n - m_n)/Mn\right] \qquad \text{(IIIb)}$$

with $D \le 1$ from said determined roasting recipes $Rm_n$, determining the temperature $T_{blend@t1}$, $T_{blend@t2}$, . . . to be applied to the customised blend of beans at each of said discrete successive times $t_1$, $t_2$, . . . according to following formula (I) or (II).

With this first mode, there is access to a limited number of roasting recipes, in particular one roasting recipe $RM_n$ for each type of coffee beans $C_n$, this roasting recipe being defined for the roasting a pre-determined quantity $M_n$ of beans.

In addition, from said roasting recipe $RM_n$ defined for the roasting a pre-determined quantity $M_n$ of beans, the roasting recipe $Rm_n$ for another quantity $m_n$ of beans according to the formulas (IIIa) and (IIIb) is calculated Then, this roasting recipe $Rm_n$ is used to determine the temperature to be applied to the customised blend of beans at each of said discrete successive times $t_1$, $t_2$, . . . according to following formula (I) or (II)

In one mode by default, D equals 1.

In a particular embodiment of this first mode, based on the obtained type $C_n$ of the coffee beans, the method comprises the steps of:

- getting access to a coefficient $D_n$ specific to said type $C_n$ of coffee beans, and
- determining the roasting recipe $RM_n$ defined for the roasting a pre-determined quantity $M_n$ of beans $C_n$ by determining the temperature $T_m$ to be applied to the obtained quantity $m_n$ of beans at each of said discrete successive times $t_1$, $t_2$, . . . as follows:

$$\text{if } m_n > M_n\text{, then } Tm_{n@ti} = TM_{n@ti} + \left[TM_{n@ti} \cdot D_n \cdot (m_n - M_n)/M_n\right] \quad \text{(IIIa)}$$

$$\text{if } m_n < M_n\text{, then } Tm_{n@ti} = TM_{n@ti} - \left[TM_{n@ti} \cdot D_n \cdot (M_n - m_n)/M_n\right] \quad \text{(IIIb)}$$

Selection of the Roasting Recipe $Rm_n$ from a Series of Pre-Determined Roasting Recipes $RM_n$ In one second mode of the step of determining, for at least one coffee $C_n$, the roasting recipe $R_n$ adapted to the roasting of the obtained quantity $m_n$ of beans of said identified type $C_n$, the method comprises the steps of:

- getting access, for at least one type of coffee beans $C_n$, to at least one series of roasting recipes ($RM_{ny}$, $RM_{nyi+1}$, . . . ) adapted to the roasting of different successive pre-determined quantities ($M_{ny}$, $M_{nyi+1}$ . . . ) of beans of type $C_n$ respectively and to said pre-determined quantities $M_{ny}$, $M_{ny+1}$, . . . , and
- for said at least one coffee $C_n$ part of the customised blend, determining roasting recipe $Rm_{ny}$ adapted to the roasting of the obtained quantity $m_n$ of beans of said identified type $C_n$, by selecting one of the recipes of the at least one accessible series of roasting recipes, said selection comprising identifying the roasting recipe adapted to the roasting of a pre-determined quantity $M_{ny}$ of beans, said pre-determined quantity of beans presenting the smallest difference of quantity $M_{ny}$ with the obtained quantity $m_n$.
- from said determined roasting recipe $Rm_{ny}$, determining the temperature $T_{blend@t1}$, $T_{blend@t2}$, . . . , to be applied to the customised blend of beans at each of said discrete successive times $t_1$, $t_2$, . . . according to formula (I) or (II).

Within this second mode, for at least one type of beans, there is access to a series of multiple roasting recipes ($RM_{ny}$, $RM_{nyi+1}$, . . . ) adapted to different pre-determined quantities ($M_{ny}$, $M_{nyi+1}$, . . . ) of beans of the specific type $C_n$. These different pre-determined quantities can be set to cover different quantities between a minimum quantity and a maximum quantity able to be roasted inside the apparatus. Preferably, the differences between two different successive pre-determined quantities are the same from said minimum quantity to said maximum quantity. Accordingly, for one type of beans, there is access to a series of roasting recipes adapted to the roasting of different successive pre-determined quantities ($M_{ny}$, $M_{nyi+1}$, . . . ).

The different roasting recipes adapted to the roasting of different pre-determined quantities of beans are usually defined by experimentation.

Based on the obtained quantity $m_n$ of coffee beans $C_n$ introduced inside the blend, the accessible roasting recipe $R_{ny}$ to be applied on said obtained quantity $M_{ny}$ of coffee beans introduced inside the chamber is selected.

Determination of the Roasting Recipe $Rm_n$ from a Series of Pre-Determined Roasting Recipes $RM_n$ In another third mode of the step of determining, for at least one coffee Cn, the roasting recipe $R_n$ adapted to the roasting of the obtained quantity $m_n$ of beans of said identified type $C_n$, the method comprises the steps of:

- getting access, for at least one type of coffee beans $C_n$, to at least one series of roasting recipes ($RM_{ny}$, $RM_{nyi+1}$, . . . ) adapted to the roasting of different successive pre-determined quantities ($M_{ny}$, $M_{nyi+1}$, . . . ) of beans of type $C_n$ respectively, and
- for said at least one coffee $C_n$ part of the customised blend, determining the roasting recipe $Rm_n$ adapted to the roasting of the obtained quantity $m_n$ of beans of said identified type $C_n$ by:
  - identifying in said at least one series of roasting recipes the two accessible roasting recipes $RM_{ny}$ and $RM_{nyi+1}$ adapted to the roasting of two successive pre-determined quantities $M_{ny}$ and $M_{ny+1}$ of beans respectively, wherein the quantity $m_n$ is comprised between said two successive pre-determined quantities $M_{ny}$ and $M_{ny+1}$,
  - from said two identified roasting recipes $RM_{ny}$ and $RM_{nyi+1}$, said roasting recipes providing the temperatures $Tm_{ny@t1}$, $T_{Mny@t2}$, . . . and $T_{Mny+1@t1}$, $T_{Mny@t2}$, respectively applied at discrete successive times $t_1$, $t_2$, . . . , determining the temperature $Tm_{n@t1}$, $Tm_{n@t2}$ . . . to be applied to the obtained quantity $m_n$ of beans at each of said discrete successive times $t_1$, $t_2$, . . . as follows:

$$Tm_{n@ti} = TM_{ny@ti} + [(T_{Mny+1@ti} - TM_{ny@ti}) \cdot E \cdot (m_n - M_{ny}) / (M_{ny+1} - M_{ny})] \text{ with } E \leq 1, \quad \text{(IV)}$$

- from said determined roasting recipe $Rm_n$, determining the temperature $T_{blend@t1}$, $T_{blend@t2}$ to be applied to the customised blend of beans at each of said discrete successive times $t_1$, $t_2$, . . . according to formula (I) or (II).

This third mode provides a more accurate determination of the roasting recipe $R_n$ to be applied on said quantity $m_n$ of coffee beans $C_n$ compared to the previous modes since a specific roasting profile is determined for each specific quantity.

By default, E equals 1.

In a particular embodiment of this third mode, based on the obtained type $C_n$ of the coffee beans, the method can comprise the steps of:

- getting access to a coefficient $E_n$ specific to said type $C_n$ of coffee beans, and
- determining the roasting recipe $RM_n$ defined for the roasting a pre-determined quantity $M_n$ of beans Cn by determining the temperature $T_m$ to be applied to the obtained quantity $m_n$ of beans at each of said discrete successive times $t_1$, $t_2$, . . . as follows:

$$T_{mn@i} = T_{Mny@ti} + \left[(T_{Mny+1@ti} - T_{Mny@ti}) \cdot E_n \cdot (mn - Mn_y)/(Mn_{y+1} - Mn_y)\right]. \quad \text{(IV)}$$

In another fourth mode of the step of determining, for at least one coffee $C_n$, the roasting recipe $R_n$ adapted to the roasting of the obtained quantity $m_n$ of beans of said identified type $C_n$, the method can comprise the steps of:

- getting access, for at least one type of coffee beans $C_n$, to at least one series of roasting recipes ($RM_{ny}$, $RM_{nyi+1}$, . . . ) adapted to the roasting of different successive pre-determined quantities ($M_{ny}$, $M_{nyi+1}$, . . . ) of beans of type $C_n$ respectively, and for said at least one coffee $C_n$ part of the customised blend, determining the roasting recipe $Rm_n$ adapted to the roasting of the obtained quantity $m_n$ of beans of said identified type $C_n$ by:

identifying in said at least one series of roasting recipes the two accessible roasting recipes $RM_{ny}$ and $RM_{nyi+1}$ adapted to the roasting of two successive pre-determined quantities $M_{ny}$ and $M_{ny+1}$ of beans respectively, wherein the quantity $m_n$ is comprised between these two successive pre-determined quantities $M_{ny}$ and $M_{ny+1}$, from said two identified roasting recipes $RM_{ny}$ and $RM_{nyi+1}$, said roasting recipes providing the temperatures $TM_{ny@t1}$, $TM_{ny@t2}$, . . . and $TM_{ny+1@t1}$, $TM_{ny@t2}$, respectively applied at discrete successive times $t_1$, $t_2$, . . . , determining the temperature $Tm_{n@t1}$, $Tm_{n@t2}$ . . . to be applied to the obtained quantity $m_n$ of beans at each of said discrete successive times $t_1$, $t_2$, . . . as follows:

$$\text{if } m_n \text{ is closer to } M_{ny}, \text{ then } Tm_{n@ti}=TM_{ny@ti}+[(TM_{ny+1@ti}-TM_{ny@ti})\cdot E\cdot(m_n-M_{ny})/(M_{ny+1}-M_{ny})]$$

$$\text{if } m_n \text{ is closer to } M_{ny+1}, \text{ then } Tm_{n@ti}=TM_{ny@ti}-[(TM_{ny+1@ti}-TM_{ny@ti})\cdot E\cdot(M_{ny+1}-m_n)/(M_{ny+1}-M_{ny})]$$

with $E\leq 1$, from said determined roasting recipe $Rm_n$, determining the temperature $T_{blend@t1}$, $T_{blend@t2}$ to be applied to the customised blend of beans at each of said discrete successive times $t_1$, $t_2$, . . . according to formula (I) or (II).

This fourth mode provides a more accurate determination of the roasting recipe $R_n$ to be applied on said quantity $m_n$ of coffee beans compared to the third mode.

By default, E equals 1.

In a particular embodiment of this third mode, based on the obtained type $C_n$ of the coffee beans, the control system can be configured:

to get access to a coefficient $E_n$ specific to said type $C_n$ of coffee beans, and to determine the roasting recipe $RM_n$ defined for the roasting a pre-determined quantity $M_n$ of beans $C_n$ by determining the temperature $Tm_n$ to be applied to the obtained quantity $m_n$ of beans at each of said discrete successive times $t_1$, $t_2$, . . . as follows:

$$\text{if } m_n \text{ is closer to } M_{ny}, \text{ then } Tm_{n@ti}=TM_{ny@ti}+[(TM_{ny+1@ti}-TM_{ny@ti})\cdot E_n\cdot(m_n-M_{ny})/(M_{ny+1}-M_{ny})]$$

$$\text{if } m_n \text{ is closer to } M_{ny+1}, \text{ then } Tm_{n@ti}=TM_{ny@ti}-[(TM_{ny+1@ti}-TM_{ny@ti})\cdot E_n\cdot(M_{ny+1}-m_n)/(M_{ny+1}-M_{ny})]$$

In a second aspect, there is provided a method of roasting a customised blend of coffee beans $C_A$, $C_B$, . . . using the apparatus such as described above and applying a roasting recipe $R_{blend}$ providing the temperature $T@t_1$, $T@t_2$, . . . to be applied at discrete successive times $t_1$, $t_2$, . . . , respectively, the method comprising:

obtaining for each type of coffee beans $C_n$ comprised in said blend at least:

the type $C_n$ of said type of coffee beans, and the quantity $m_n$ of said type of coffee beans $C_n$ introduced in the chamber, and based on the obtained type $C_n$, getting access at least to:

roasting recipes $RM_A$, $RM_B$, . . . of the different types of coffee beans $C_A$, $C_B$, . . . respectively, each recipe $RM_n$ being adapted to the roasting of one pre-determined quantity $M_n$ of beans of same type $C_n$ and providing the temperatures $Tm_n@t_i$ to be applied at discrete successive times $t_i$ respectively, and temperature adaptation factors $K_A$, $K_B$, . . . of different types of coffee beans $C_A$, $C_B$, . . . respectively, and based on the obtained quantities $m_n$ of the different coffee beans $C_n$ and the accessible roasting recipes $RM_n$ and temperature factors $K_n$, determining the roasting recipe $R_{blend}$ to be applied to said customised blend of coffee beans introduced inside the chamber.

In a third aspect, there is provided an apparatus for roasting coffee beans comprising:

a chamber to contain coffee beans, a heating device to heat coffee beans contained in the chamber, a control system operable to control the heating device and configured to apply a roasting recipe R providing the temperature $T_{@t1}$, $T_{@t2}$, $T_{@tfinal}$ to be applied at discrete successive times $t_1$, $t_2$, . . . , $t_{final}$ respectively, wherein, for a customised blend of coffee beans $C_A$, $C_B$, . . . introduced inside the chamber, the control system is configured to determine the recipe Rym for roasting said blend in the roasting apparatus according to the method such as described above.

In a fourth aspect, there is provided a computer program which, when executed by a computer, processor or control unit, cause the computer, processor or control unit to perform the method such as described above.

Generally, this computer program can be executed by the processing unit of the roasting apparatus.

In one embodiment, the computer program can be executed at least in part by the processing unit of a device external to the apparatus for roasting coffee beans.

By external device, it is meant a device that is physically separated from the apparatus for roasting coffee beans. Such an external device can be a device to obtain the type and/or the quantity of beans, such as a scale and/or a code reader, or a mobile device, like a tablet or smartphone, to get input about the type and/or the quantity of beans and remote access to roasting recipes, temperature and/or time adaptation factors.

The computer program can be executed by the processing unit of the roasting apparatus and the processing unit of said external devices, all said processing units communicating together. The processing unit of the mobile device can be configured to apply all the steps of the method and finally provide the determined roasting recipe of the blend to the processing unit of the roasting apparatus so that said apparatus roasts the blend. Alternatively the processing unit of the mobile device can be configured to implement some steps only of the method such as obtaining the type and/or the quantity of beans and/or getting access to pre-determined pieces of information such as roasting recipes, temperature and/or time adaptation factors and supplying them the processing unit of the roasting apparatus, that can determine the roasting recipe of the blend from said pieces of information.

The computer program can be provided as an app inside the processing unit of the mobile device.

In a fifth aspect, there is provided a computer readable storage medium comprising instructions which, when executed by a computer, processor or control unit cause the computer, processor or control unit to carry out the method such as described above.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

Specific embodiments of the invention are now described further, by way of example, with reference to the following drawings in which.

DETAILED DESCRIPTION OF EXEMPLARY EMBODIMENTS

Roasting Apparatus

Figure 1:
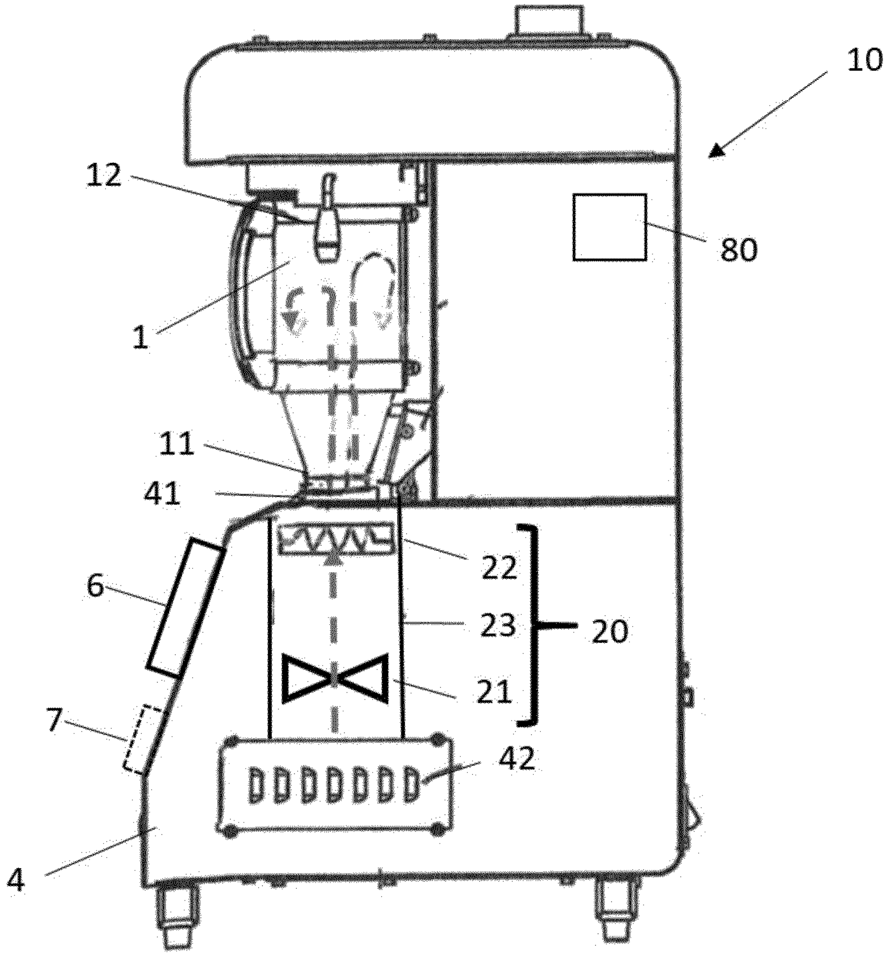
FIG. 1 is a schematic view of a roasting apparatus according to the invention.

FIG. 1 shows an illustrative side view part of a roasting apparatus 10. Functionally, the roasting apparatus 10 is operable to roast coffee beans hold in a chamber 1 by means of a flow of hot air introduced inside this chamber. At a first level, the apparatus comprises: a housing 4, a roasting unit and a control system 80. These components will now be sequentially described.

Roasting Unit of Roasting Apparatus

The roasting unit is operable to receive and roast coffee beans.

The roasting unit typically comprises at a second level of the roasting apparatus 10: a chamber 1 and a heating device 2, which are sequentially described.

The chamber 1 is configured to receive and hold the coffee beans introduced by the operator. In the preferred embodiment, the chamber 1 is removable from the housing 4. The chamber can be put aside the roasting apparatus:

- for the introduction or the removal of coffee beans, or
- for cleaning and maintenance of the chamber once it is removed, or
- for cleaning of the vertical housing part 43 behind the chamber.

The bottom opening 11 of the chamber is configured to enable air to pass through, specifically it can comprise a perforated plate on which the beans can lie and through which air can flow upwardly. The chamber 1 comprises a handle in order to enable the user to remove the chamber from the housing and hold it outside the housing.

A chaff collector (no illustrated) is in flow communication with the chamber 1 to receive chaffs that progressively separate from the beans and due to their light density are blown off to the chaff collector.

The heating device 2 comprises an air flow driver 21 and a heater 22.

The air flow driver 21 is operable to generate a flow of air (dotted lines arrows) in direction of the bottom of the chamber. The generated flow is configured to heat the beans and to agitate and lift the beans. As a result the beans are homogenously heated. Specifically, the air flow driver can be a fan powered by a motor. Air inlets 42 can be provided inside the base of the housing in order to feed air inside the housing, the air flow driver blowing this air upwardly though a passage 23 to an air outlet hole 41 in direction of the chamber 1 as illustrated by dotted lines arrows.

The heater 22 is operable to heat the flow of air generated by the air flow driver 21. In the specific illustrated embodiment, the heater is an electrical resistance positioned between the fan 21 and the bottom opening 11 of the chamber with the result that the flow of air is heated before it enters the chamber 1 to heat and to lift the beans. Other types of heater can be used such as infrared heating, gas burner, . . . .

The heater 22 and/or the air flow driver 21 is/are operable to apply a roasting profile to the beans, this roasting profile being defined as a curve of temperature against time.

When the chamber is mounted to the housing, the bottom of the chamber is tightly connected to the air outlet hole 41 to avoid that the flow of hot air flow leaks at the connection.

The top opening 12 of the chamber is connected to a smoke and particulates evacuation device (not illustrated).

Although the invention is described with a roaster implementing a fluidized bed of hot air, the invention is not limited to this specific type of roasting apparatus. Drum roasters and other kinds of roasters can be used.

The roasting apparatus 10 usually comprises a user interface 6 enabling the display and the input of information.

The roasting apparatus can comprise a code reader 7 to read a code associated to a type of coffee beans, for example present on the package of coffee beans. Preferably, this code reader is positioned in the apparatus so that the operator is able to easily position a code in front of it. It is preferably positioned at the front face of the apparatus, for example close to a user interface 6 of the apparatus. Accordingly, information provided by the code can be immediately displayed through the display of the user interface 6 positioned aside.

Control System of Roasting Apparatus

With reference to FIGS. 1 and 2A, the control system 80 will now be considered: the control system 80 is operable to control the components of the apparatus to roast coffee beans. The control system 80 typically comprises at a second level of roasting apparatus: the user interface 6, a processing unit 8, temperature probe 5, a power supply 9, a memory unit 13, optionally a database 12, sensors 10, optionally a communication interface 11 for remote connection, optionally a code reader 7, optionally a measuring device 3.

The user interface 6 comprises hardware to enable a user to interface with the processing unit 8, by means of user interface signal. More particularly, the user interface receives commands from a user, the user interface signal transfers the said commands to the processing unit 8 as an input. The commands may, for example, be an instruction to execute a roasting process and/or to adjust an operational parameter of the roasting apparatus 10 and/or to power on or off the roasting apparatus 10. The processing unit 8 may also output feedback to the user interface 6 as part of the roasting process, e.g. to indicate the roasting process has been initiated or that a parameter associated with the process has been selected or to indicate the evolution of a parameter during the process or to create an alarm.

In particular, the user interface can be used:

- to provide the types $C_n$ of the different coffee beans introduced inside the chamber by the user by manual input such as selection of an identification type in a list of pre-selected coffee beans or by entering a digital reference of the coffee, for example read from a coffee beans package or a user's manual.
- to provide the quantities $m_n$ of the different coffee beans forming the customised blend introduced inside the chamber by manual input.

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 20 can be formed as one unit or a plurality of discrete units.

A part of the user interface can also be on a mobile app when the apparatus is provided with a communication interface 11 as described below. In that case at least a part of input and output can be transmitted to the mobile device through the communication interface 11.

The sensors 10 are operable to provide an input signal to the processing unit 8 for monitoring of the roasting process and/or a status of the roasting apparatus. The input signal can be an analogue or digital signal. The sensors 10 typically comprise at least one temperature sensor 5 and optionally one or more of the following sensors: level sensor associated with the chamber 1, air flow rate sensor, position sensor associated with the chamber and/or the chaff collector.

Figure 8:
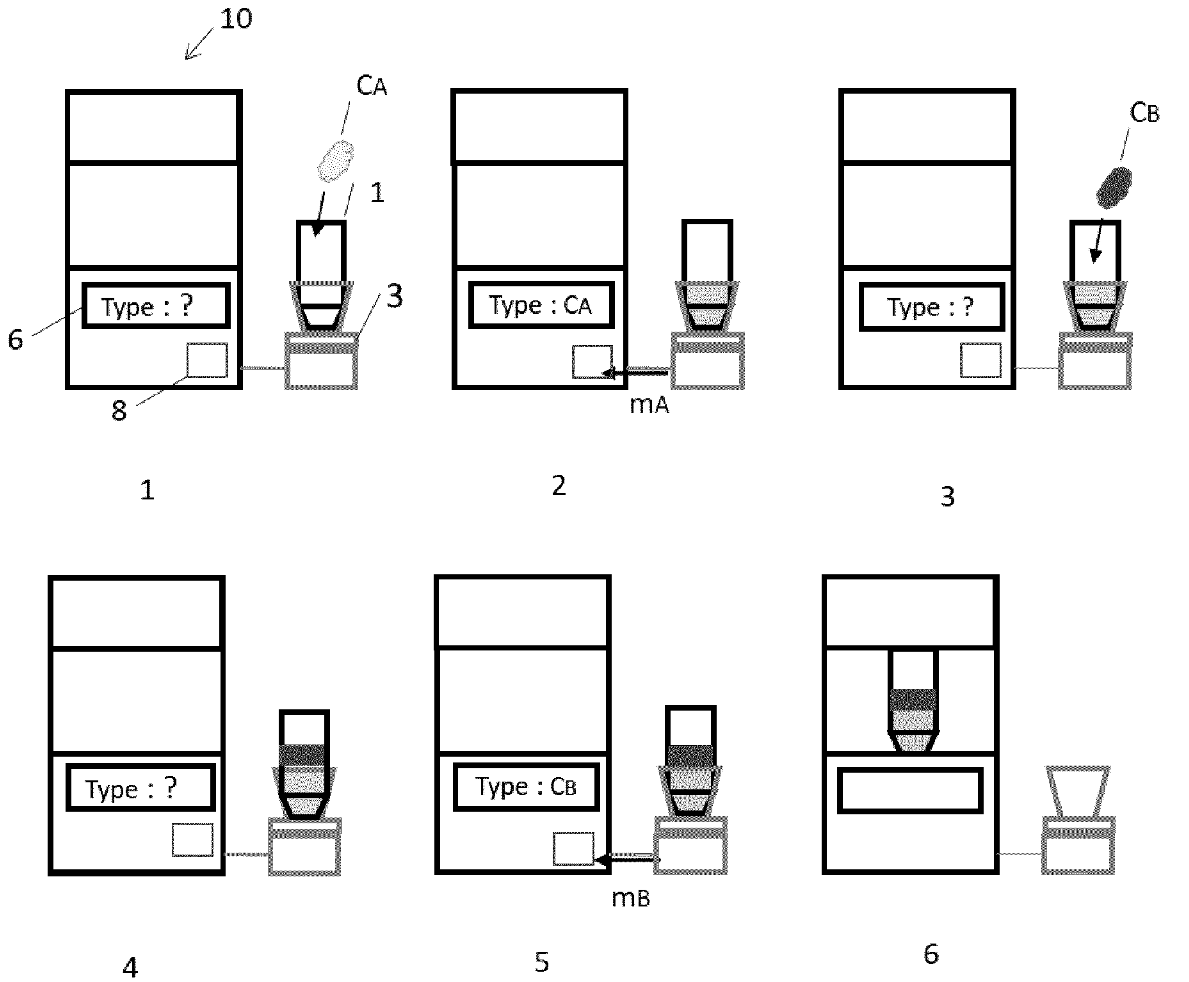

If the apparatus or the system comprises a measuring device 3 (for example as illustrated in FIG. 8), this measuring device is operable to provide the input that is the quantity of coffee beans introduced inside the chamber 1. This input can be the weight of the beans measured by a scale or a volume of beans or a level measured by a level sensor associated with the chamber 1.

A code reader 7 can be provided and operable to read a code, for example on coffee beans package, and automatically provide an input that is the identification of the type Cn coffee beans introduced in the chamber 1 and optionally operation conditions for roasting a specific quantity Mn of said coffee beans.

The processing unit 8 generally comprise memory, input and output system components arranged as an integrated circuit, typically as a microprocessor or a microcontroller. The processing unit 8 may comprise other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programed logic or to additionally comprise programmed logic. The processing unit 8 may also comprise one or more of the aforementioned integrated circuits. An example of the later is several integrated circuits arranged in communication with each other in a modular fashion e.g.: a slave integrated circuit to control the user interface 6 in communication with a master integrated circuit to control the roasting apparatus 10.

The power supply 9 is operable to supply electrical energy to the said controlled components and the processing unit 8. The power supply 9 may comprise various means, such as a battery or a unit to receive and condition a main electrical supply. The power supply 9 may be operatively linked to part of the user interface 6 for powering on or off the roasting apparatus 10.

The processing unit 8 generally comprises a memory unit 13 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic. The instructions stored on the memory unit 13 can be idealised as comprising a coffee beans roasting program.

The control system 80 is operable to apply this coffee beans roasting program by controlling the heating device 2—that is, in the particular illustrated embodiment of FIG. 1, the air flow driver 21 and/or the heater 22—usually using signal of the temperature probe 5.

The coffee beans roasting program can effect control of the said components using extraction information encoded on the code and/or other information that may be stored as data on the memory unit 13 or from a remote source through the communication interface 11 and/or input provided via the user interface 6 and/or signal of the sensors 10.

In particular, the control system 80 is configured to apply a roasting recipe (R) providing the temperature $T_{@t1}$, $T_{@t2}$, $T_{@tfinal}$ to be applied at discrete successive times $t_1$, $t_2$, . . . , $t_{final}$ respectively.

With that aim, the processing unit 8 is operable to:

- receive an input of the temperature probe 5,
- process the input according to roasting recipe R,
- provide an output, which is the roasting recipe R. More specifically the output comprises the operation of at least the heater 22 and the air flow driver 21.

The temperature measured by the temperature probe 5 is used to adapt the power of the heater 22 and/or the power of the air driver 21 in a feedback loop in order to apply the roasting recipe R to the beans.

Depending on the type of control applied in the roaster, the heater 22 can be powered at one pre-determined power, meaning its temperature is constant, and in that case the power of the air driver 21 can be controlled based on the temperature monitored at the probe 5 in order to vary the time of contact of the flow air through the heater during its movement.

Alternatively, the air driver 21 can be powered at one pre-determined power, meaning the flow rate of air is constant, and in that case the power of the heater 22 can be controlled based on the temperature monitored at the probe 5 in order to heat more or less air during its passage through the heater.

In a last alternative, both heater 22 and air driver 21 can be controlled based on the monitoring of the temperature by probe 5.

The control system 80 can comprise a communication interface 11 for data communication of the roasting apparatus 10 with another device and/or system, such as a server system, a mobile device and/or a physically separated measuring apparatus 3. The communication interface 11 can be used to supply and/or receive information related to the coffee beans roasting process, such as roasting process information, type of the beans, quantity of beans. The communication interface 11 may comprise first and second communication interface for data communication with several devices at once or communication via different media.

The communication interface 11 can be configured for cabled media or wireless media or a combination thereof, e.g.: a wired connection, such as RS-232, USB, 120, Ethernet define by IEEE 802.3, a wireless connection, such as wireless LAN (e.g. IEEE 802.11) or near field communication (NFC) or a cellular system such as GPRS or GSM. The communication interface 11 interfaces with the processing unit 8, by means of a communication interface signal. Generally the communication interface comprises a separate processing unit (examples of which are provided above) to control communication hardware (e.g. an antenna) to interface with the master processing unit 8. However, less complex configurations can be used e.g. a simple wired connection for serial communication directly with the processing unit 8.

The processing unit 8 enables access to different roasting recipes ($RM_A$, $RM_B$, . . . ) adapted to the roasting of pre-determined quantities ($M_A$, $M_B$, . . . ) of beans of different natures ($C_A$, $C_B$, . . . ).

These recipes and the pre-determined quantities can be stored in the memory 13 of the processing unit 8. Alternatively, these data can be stored in a remote server and the processing unit 8 can be supplied with access to this remote server through the communication interface 11, directly or indirectly through a mobile device establishing connection between the remote server and the processing unit.

The control system 80 can comprise a database 12 storing information about coffee beans, in particular about the operation conditions for roasting specific coffee beans as described hereunder. The database 12 can be stored locally in the memory 13 of the control system of the roasting apparatus or remotely in a server accessible through the communication interface 13.

In one alternative embodiment, the control system can be provided with the roasting recipes $Rm_n$, and depending on the embodiment with their associated pre-determined quantities $M_n$, during a code reading operation, these pieces of information being encoded inside the code and decoded by the control system.

The roasting apparatus 10 and the control system 80 are configured for roasting a customised blend of different coffee beans introduced inside the chamber 1. This customised blend is defined by the types $C_n$ of beans part of the blend and the respective quantities $m_n$ of said types of beans.

In the present invention, the customised blend can be a mixture created from:

different beans of single origin only, or different types of pre-existing blends of beans only. In that case, pre-existing blends of coffee beans can be used and mixed together to create new customised and more complex blends.

or at least one bean of single origin and at least one pre-existing blend of beans.

In the description the types $C_A$, $C_B$ . . . $C_n$ relate indifferently to beans of single origin or pre-existing blends of beans.

When a customised blend of different types of coffee beans, like for example $C_A$ and $C_B$ in quantities $m_A$ and $m_B$ respectively, is introduced inside the chamber 1 in order to be roasted, the processing unit 8 of the apparatus of the present invention is configured to implement several steps.

First, the processing unit 8 of the apparatus of the present invention is configured to obtain for each type of coffee beans $C_n$ comprised in said blend:

the type $C_n$ of coffee beans, and the quantity $m_n$ of said type of coffee beans $C_n$ introduced in the chamber.

As mentioned earlier, information about identification and quantity can be provided through the user interface 6 of the roasting apparatus, the display of the user interface guiding the user to enter information for each types of coffee.

Alternatively, for the type of the coffee types, information about the types of coffee introduced inside the chamber can be obtained by means of a code reader 7, the user being able or incited to scan the code of the different beans in front of the code reader 15.

Alternatively, for the quantity of the beans of each type, the quantity of each type of coffee can be measured and automatically communicated to the control system 80, for example by the use a measuring device 3 either directly connected to the apparatus or indirectly through the communication interface 11, as illustrated in FIG. 8.

In a particular embodiment, the control system can be configured:

to obtain the input that is the global weight composition of the customised blend, that is the types $C_n$ of coffee beans and the corresponding weight fraction $f_n$, to obtain the total weight of said customised blend to roasted, for example 500 g, to calculate the weight of each type of coffee $C_n$ corresponding to the fraction $f_n$ for said global weight, as an output, to request the operator to introduce each calculated weight $m_n$ of coffee $C_n$ in the chamber.

Then, in a further step, the control system of the roasting apparatus is configured to get access to information related to the roasting of these specific types of coffee beans $C_n$, for example $C_A$ and $C_B$, part of the customised blend, and in particular to:

the roasting recipes $R_A$, $R_B$ of the different identified types of coffee beans $C_A$, $C_B$ respectively.

Each of said recipes $R_n$ is usually adapted to the roasting of one pre-determined quantity $m_n$ of beans of same type $C_n$ and provides the temperatures $Tm_n@t_i$ to be applied to this quantity of beans $C_n$ at discrete successive times t respectively.

and temperature adaptation factors $K_A$, $K_B$ of the different identified types of coffee beans $C_A$, $C_B$ respectively, and optionally:

time adaptation factors $S_A$, $S_B$ of different identified types of coffee beans $C_A$, $C_B$ respectively.

In one embodiment, the control system comprises a memory or database 12 storing these roasting recipes $R_A$, $R_B$, the temperature adaptation factors $K_A$, $K_B$ of said different types of coffee beans $C_A$, $C_B$ and optionally the time adaptation factors $S_A$, $S_B$ of said different types of coffee beans $C_A$, $C_B$ and the processing unit 8 of the control system is configured to get access to said database.

This database 12 can be stored locally in the memory unit 13 of the processing unit or in a remote server accessible through the communication interface 11 of the control system. This remote database can be accessible through remote connection with a mobile device or through connection with a modem.

Based on the first step where identification and quantities of each of the different coffee beans part of the customised blend are obtained, the control system 80 is configured to get aces to the above roasting recipes and factors in the database 12.

In one alternative embodiment, the control system 80 can be provided with the roasting recipes, the temperature adaptation factors and the time adaptation factors during the code reading operation, these pieces of information being encoded inside the code and decoded by the control system 80.

Then, in a further step, the control system is configured to calculate the roasting recipe $R_{blend}$ to be applied to the customised blend of coffee beans introduced inside the chamber based on at least:

- the quantities $m_A$ and $m_B$ of each type of beans $C_A$ and $C_B$ respectively that are part of the blend,
- the accessible roasting recipes $R_A$, $R_B$ of these beans part of the blend, and
- the accessible temperature factors $K_A$, $K_B$ of these beans part of the blend.

This roasting recipe can be used to roast the customised blend of coffees introduced in the chamber. This recipe takes into account the properties of each types of coffees and, when applied, provides a roasting of the blend that prevents over-roasting of the more fragile beans and yet sufficient roasting of the denser beans.

This roasting recipe can be calculated for any customised blend of beans in an automatic manner and guarantees a safe roasting of the blend meaning no spill of the blend.

The only condition is that the control system is able to get access to roasting recipes $R_A$, $R_B$, . . . of the different types of coffee beans $C_A$, $C_B$, . . . respectively, and to the temperature adaptation factors $K_A$, $K_B$, . . . of said coffee beans $C_A$, $C_B$, . . . respectively. In case that a new type of coffee beans is used in the customised blend, it is sufficient that at least one roasting recipe of said new type of beans to be applied for one pre-determined quantity is uploaded in the memory or database of the control system or provided through a readable code.

At each time $t_i$ the calculation is generally based on a average of the temperatures $Tm_A@t_i$ and $Tm_B@t_i$, said average being weighted with the quantity fractions ($f_A=m_A/m_A+m_B$, $f_B=m_B/m_A+m_B$) of coffees $C_A$ and $C_B$ respectively and modulated with the temperature factors $K_A$ and $K_B$ respectively.

More precisely, the roasting profile to be applied to the blend of coffee beans can be determined by the following formula (I):

$$T_{blend@t_i} = \sum_{n=A}^{C} f_n \cdot K_n \cdot T_{m_n@t_i}$$

Although one type of beans may be present inside the blend with a small quantity fraction, the sensitivity of this type of beans to temperature may be high; in particular in terms of profile aroma, colour and/or generation of acrylamides. For example, final properties of one type of beans may easily deviate from usual expected properties with a roasting profile differing too much from its own optimal roasting profile. Accordingly, in order to avoid such deviation in the roasted blend, the temperature adaption factor for this type of sensitive coffee beans is set relatively high to keep the profile of this specific type of beans in the blend close to the optimal roasting profile of this type of beans when roasted alone and in order compensate a low fraction quantity in the roasting profile formula (I) of the blend.

Figure 3:
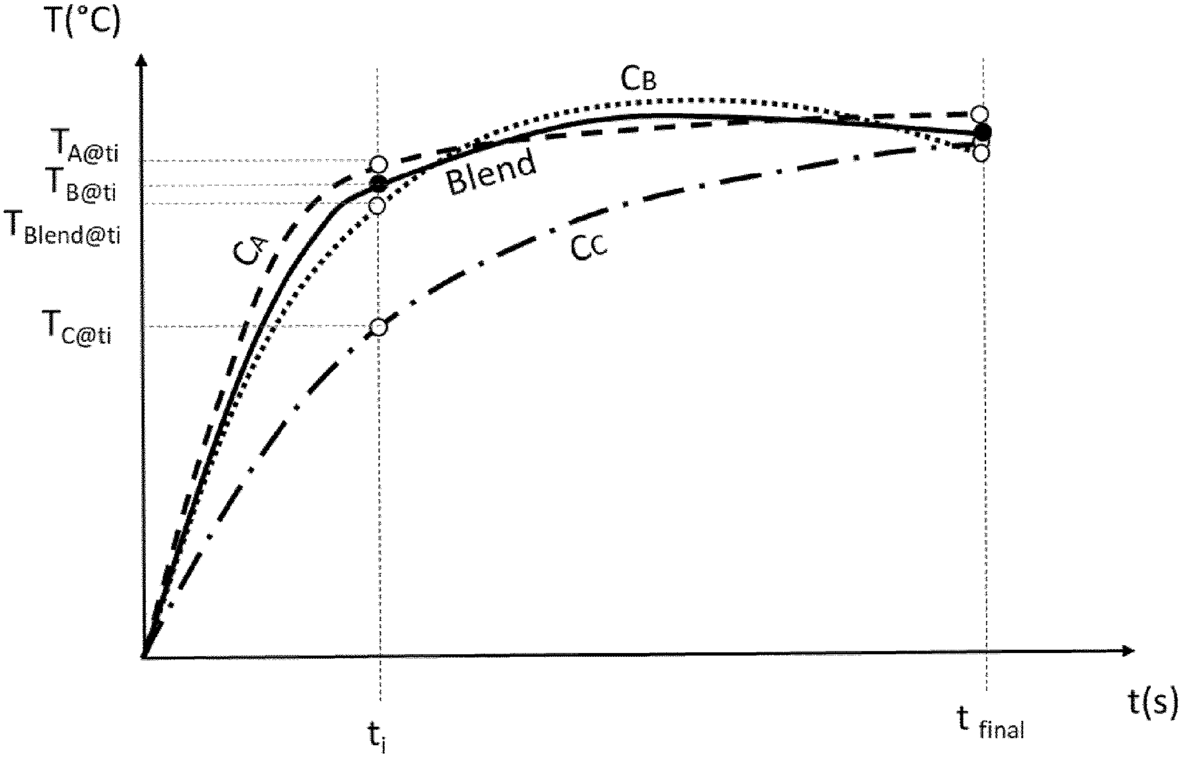
FIG. 3 illustrates the calculation of the roasting profile of a blend of coffees derived from the roasting profiles of said coffees.

As an example, FIG. 3 illustrates the calculation of the roasting profile of a blend of three coffees A, B and C derived from the roasting profiles of each of said coffee A, B and C.

For a blend comprising:

- 50% in weight of coffee A, said coffee presenting a temperature factor $K_A$ of 1 and a roasting temperature at time ti of 220° C., and
- 30% in weight of coffee B, said coffee presenting a temperature factor $K_B$ of 0.9 and a roasting temperature at time ti of 205° C., and
- 20% in weight of coffee C, said coffee presenting a temperature factor $K_C$ of 1 and a roasting temperature at time ti of 185° C., the roasting temperature to be applied to the blend at time ti is:

$$\begin{aligned} T_{blend\,@ti} &= (0{,}5\times1\times220)+(0{,}3\times0{,}9\times205)+(0{,}2\times1\times185) \\ &= 110+55{,}35+37 \\ &= 202{,}35°\text{C} \end{aligned}$$

Curves Interpolation

Often the roasting recipes Rn of the coffee beans are defined by discrete sets of points (ti, $T_{@ti}$) rather than with a complete continuous curve.

In a customised blend of different coffees, it can happen that the roasting recipes of the different coffee beans are not defined by discrete sets of points set at the same abscissas ti.

In that case, the calculation of the roasting profile of the blend preferably comprises an intermediate additional step to interpolate the different accessible curves of the roasting recipes $R_n$ so that all the accessible roasting recipes Rn provide the temperatures $Tm_n@t_1$, $Tm_n@t_2$, $Tmn@t_{final}$ to be applied at the same discrete successive abscissa times $t_1$, $t_2$, . . . $t_{final}$ and to be able to calculate the roasting profile of the blend by means of the formula (I) applied at each of said discrete successive abscissa times $t_1$, $t_2$, . . . $t_{final}$.

Figure 4:
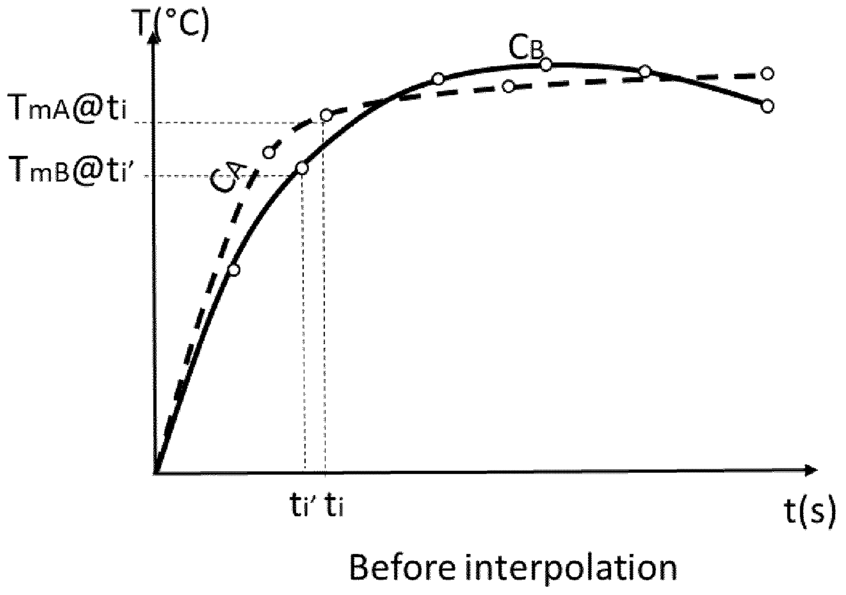
FIG. 4 illustrates the process of interpolation of roasting profiles curves.
Figure 4:
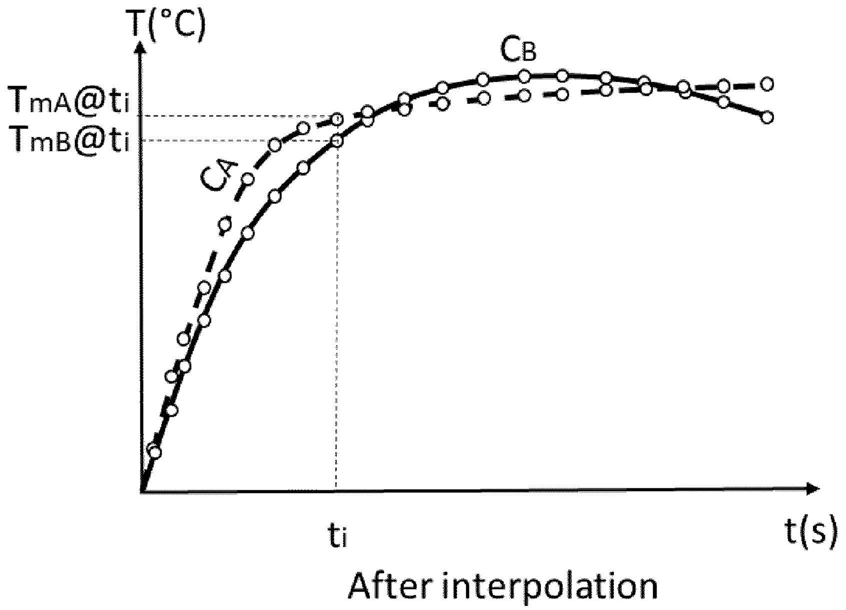

FIG. 4 illustrates the process of interpolation of two roasting profiles curves of one coffee $C_A$ and one coffee $C_B$. The first diagram shows the roasting profile curves of $C_A$ and $C_B$ such as provided to the control system, through database, memory or code. It appears that the curves do not present points at common abscissa. The second diagram shows the roasting profile curves of $C_A$ and $C_B$ after a process step of interpolation: both roasting profile curves provide temperatures $Tm_A@ti$ and $Tm_B@ti$ at the same abscissas ti.

Interpolation is a process that can be automatically implemented by an algorithm applied by the control system. The choice of the new abscissa ti at which interpolation is executed can be defined at regular times, for example at every 10 seconds or 20 seconds, or at particular periods in the timeline, for example every 10 seconds during the period covering the first crack periods of all the coffee beans part of the blend, and then every 10 seconds until and during the second crack periods of all the coffee beans part of the blend.

Figure 5:
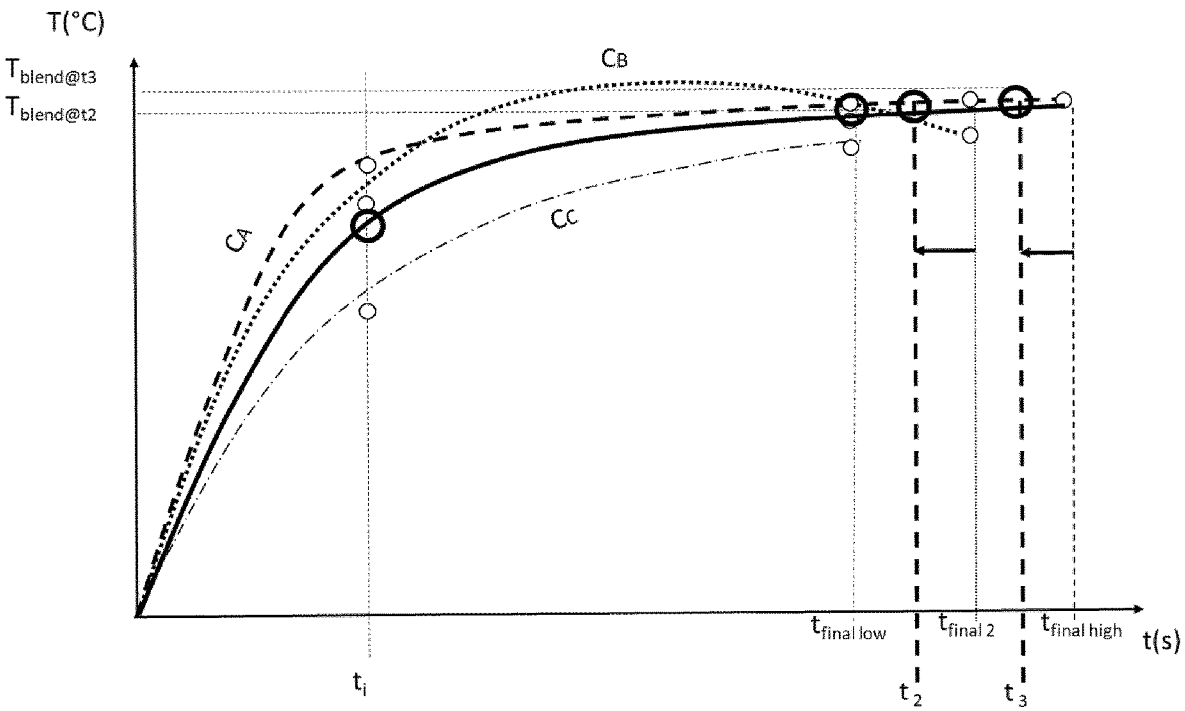
FIG. 5 illustrates the calculation of the roasting profile of a blend of coffees derived from the roasting profiles of said coffees presenting different timelines.

Determination of the Roasting Recipe $Rm_n$ from Pre-Determined Roasting Recipes $RM_n$ with Different Final Times It can happen that the different roasting recipes $R_n$ of the different coffee beans are defined by curves or discrete sets of points wherein the last abscissa $t_{final}$ different from one type of is coffee to another for at least two of the coffees part of the blend as illustrated in FIG. 5A.

In that case, the processing unit can be configured to implement additional steps to determine the roasting recipe $R_{blend}$ of the blend.

In particular, the control system can be configured to obtain additional information about the coffee beans of the blend that is time adaptation factors $S_A$, $S_B$, $S_n$ for each identified type of coffee beans $C_A$, $C_B$, . . . $C_n$ respectively.

In addition, the processing unit is configured to obtain the final times t $t_{final\ n}$ of all the coffees $C_n$ part of the customised blend (for example through the different roasting recipes $R_n$ of the identified coffees or alternatively by direct access to that piece of information) and to sort said obtained final times in a series of time $t_{final\ y}$ in an ascending order from the smallest final time $t_{final\ low}$, $t_{final\ low+1}$ up to the highest $t_{final\ high}$.

Then, the processing unit is configured to determine the roasting recipe $R_{blend}$ of the blend as follows:

- for times inferior or equal to the smallest final time $t_{final\ low}$, the processing unit determines the roasting recipe ($R_{blend}$) to be applied to said blend of coffee beans introduced inside the chamber according to above defined formula (I),
- for times superior to the smallest final time $t_{final\ low}$, the processing unit determines the roasting recipe $R_{blend}$ to be applied to said blend of coffee beans introduced inside the chamber by setting temperatures to be applied at new calculated times $t_y$, as follows:
  - each of said new calculated times $t_y$ is calculated from each corresponding obtained final time $t_{final\ y}$, from $t_{final\ low+1}$ up to $t_{final\ high}$, as follows:

$t_y = t_{final\ y-1} + [(t_{final\ y} - t_{final\ y-1}) * \Sigma(f_{n'} \cdot S_{n'})]$ with $n'$ corresponding to the coffees presenting a final time superior or equal to $t_{final\ y}$,

- up to $t_{final\ high-1}$, temperature is determined at each of said calculated time $t_y$ from all the roasting recipes $Rm_{n'}$ of the coffee beans $C_{n'}$ presenting a final time superior or equal to $t_{final\ y}$ according to following formula (II):

$$T_{blend@t_y} = \sum_{n'} f_{n'} \cdot K_{n'} \cdot T_{m_{n'}@t_y}$$

Preferably the values of the temperatures $Tm_{n'}$@ty are interpolated values extracted from the recipes $Rm_{n'}$ at the new calculated times ty.

- at $t_{final\ high}$:
  - if only one coffee $C_z$ presents a roasting recipe that presents a final time equal to $f_{inal\ high}$, then the temperature of the blend is the temperature of the roasting recipe of the quantity $m_z$ of said coffee $C_z$ part of the blend at said final time: $T_{blend@tfinal\ high} = Tm_z@t_{final\ z}$,
  - or
  - if at least two coffees present roasting recipes that present the same final time equal to $t_{final\ high}$, then the temperature of the blend is determined according to formula II.

This determination of the roasting recipe for a blend comprising coffees with different final times is illustrated in FIG. 5A. In the case related to this figure, the blend comprises three coffees $C_A$, $C_B$ and $C_C$ with respective quantities $m_A$, $m_B$ and $m_C$ and the figure represents the roasting curves $Rm_A$, $Rm_B$, $Rm_C$. It can be noticed that these roasting curves present different final time abscissa. Coffee C presents the smallest $t_{final\ low}$ and coffee A the highest $t_{final\ high}$, whereas coffee B presents an intermediate $t_{final\ 2}$.

The roasting curve of the blend can be determined as follows.

First up to $t_{final\ low}$, the temperature to be applied to the blend is determined by the above mentioned formula (I) calculated at different times ti. For example, at the time $t_{final\ low}$ the temperature to be applied to the blend is:

$$Tblend@t_{final\ low} = f_A \cdot K_A \cdot T_{A@t_{final\ low}} + f_B \cdot K_B \cdot T_{B@t_{final\ low}} + f_c \cdot K_c \cdot T_c@t_{final\ low}$$

Then, for times between $t_{final\ low}$ and $t_{final\ high}$, new abscissa times are calculated from the final times of the different recipes:

- a new abscissa time $t_2$ is calculated from $t_{final\ 2}$ as follows: $t_2 = t_{final\ 1} + [(t_{final\ 2} - t_{final\ 1}) * (f_B S_B + f_A S_A)]$ that is $t_{final\ low} + [(t_{final\ 2} - t_{final\ low}) * (f_B S_B + f_A S_A)]$
- a new abscissa time $t_3$ is calculated from $t_{final\ high}$ as follows: $t_3 = t_{final\ 2} + [(t_{final\ 3} - t_{final\ 2}) * (f_A S_A)]$ that is $t_2 = t_{final\ 2} + [(t_{final\ high} - t_{final\ 2}) * (f_A S_A)]$ Then at these new calculated times $t_2$ and $t_3$, the temperature of the blend is determined as follows.

At the new calculated time $t_2$, the temperature to be applied to the blend is determined by the above mentioned formula (II) calculated at time $t_2$ and only for the coffee beans presenting a final time abscissa superior or equal to $t_{final}2$ that is to say in the present case for coffees A and B only, as follows:

$$Tblend@t_2 = f_A \cdot K_A \cdot Tm_A@t_2 + f_B \cdot K_B \cdot Tm_B@t_2$$

At the new calculated time $t_3$, the temperature to be applied to the blend corresponds to $Tm_A@t_3$ since only coffee A presents a roasting recipe with a final time abscissa superior or equal to $t_{final\ 3}$.

FIG. 5A makes clear that, up to the time t final low, the roasting recipe of the blend of coffees A, B and C can be calculated at whatever abscissa ti common to the three curves interpolated or not. But, for time abscissa greater than $t_{final\ low}$, the roasting curve of the blend is determined by calculating new time abscissas t2 and t3 from $t_{final\ 1}$, $t_{final\ 2}$ and $t_{final\ 3}$ and then by calculating the temperatures of the blend at these new time abscissas respectively.

Based on the same blend of coffees $C_A$, $C_B$ and $C_C$, FIG. 5B illustrates an alternative method to determine the roasting recipe of the blend.

In that embodiment, the smallest final time $t_{final\ low}$ is identified that is here $t_{final1}$ of coffee C. Then the temperature to be applied to the blend is determined by limiting the recipe to times inferior or equal to this smallest final time $t_{final\ low}$ and for times ti inferior or equal to this smallest final time Sinai low determining the roasting recipe ($R_{blend}$) to be applied to said blend of coffee beans introduced inside the chamber according to formula (I), that is:

$$T_{blend@t_i} = f_A \cdot K_A \cdot Tm_A@t_i +$$

Whatever the embodiment, he control system such as described above is based on the access of the pre-determined roasting recipes $R_A$, $R_B$, . . . of the different types of coffee beans $C_A$, $C_B$, . . . , or eventually pre-determined roasting recipes $R_{Blend\alpha}$, $R_{Blend\beta}$, . . . ($R_{Blendx}$) of pre-determined blends Blendα, Blendβ, and the use of at least said pre-determined roasting recipes to define the roasting recipe of the new customised blend.

The roasting recipes $R_A$, $R_B$, . . . or $R_{Blend}\alpha$, $R_{Blend\beta}$, . . . can be provided more or less precisely as explained below.

Figure 6:
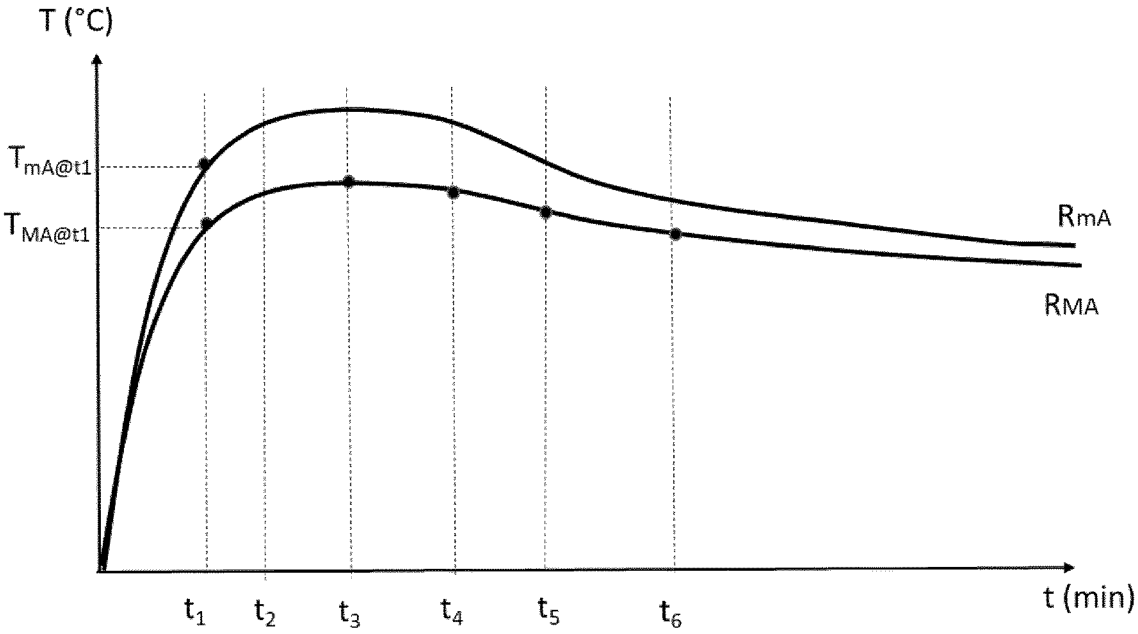
FIG. 6 illustrates the determination of the roasting recipe of a quantity $m_A$ of coffee beans $C_A$ from a roasting recipe adapted for a quantity $M_A$ of coffee beans $C_A$.

Determination of the Roasting Recipe $Rm_n$ from One Pre-Determined Roasting Recipe $RM_n$ In one first mode, the accessible roasting recipe $R_n$ of coffee beans of types $C_n$ can correspond to the roasting recipe of one single pre-determined quantity $M_n$ of beans of type $C_n$. This roasting recipe is usually defined by experimentation by defining the optimal profile for a pre-determined quantity of beans $C_n$. It is generally linked to the roasting in a type of roaster too. If the quantity $m_n$ of beans $C_n$ introduced in the customised blend is different from this quantity $M_n$ corresponding to the accessible roasting recipe, the control system can be configured to adapt this roasting profile for the quantity $m_n$ of the beans of type $C_n$ used in the customised blend before determining the roasting profile of the blend as illustrated in FIG. 6.

Accordingly, based on the access to the recipe $RM_A$ for the pre-determined quantity $M_A$, for a quantity $m_A$ of coffee $C_A$ part of the customised blend, the control system is configured to determine the roasting recipe $Rm_A$ providing the temperatures $Tm_A$@ti to be applied at time $t_i$ respectively as follows:

$$\text{if } m_A > M_A, \text{ then } Tm_{A@ti} = TM_{A@ti} + \left[TM_{A@ti} \cdot D \cdot (m_A - M_A)/M_A\right] \quad \text{(IIIa)}$$

$$\text{if } m_A < M_A, \text{ then } Tm_{A@ti} = TM_{A@ti} - \left[TM_{A@ti} \cdot D \cdot (M_A - m_A)/M_A\right] \quad \text{(IIIb)}$$

with C≤1.

For example, if for coffee $C_A$, the pre-determined quantity $M_A$ of the roasting recipe $R_{MA}$ accessible by the control system is set to 150 g and if the quantity $m_A$ of coffee beans $C_A$ in the customised blend is 160 g, then, at time $t_1$, the temperature to be applied $Tm_{A@t1}$ is:

$$Tm_{A@t1} + \left[TM_{A@t1} \times D \times (160 - 150)/150\right]$$

Alternatively, if the pre-determined quantity $M_A$ is set to 150 g and if the quantity $M_A$ of coffee beans A in the customised blend is 135 g, then, at time $t_1$, the temperature to be applied $T_{mA@t1}$ is:

$$Tm_{A@t1} - \left[TM_{A@t1} \times D \times (150 - 135)/150\right]$$

The calculation is reproduced for the different time abscissas of the roasting recipe $R_{MA}$ in order to determine the roasting recipe $Rm_A$ for the quantity $m_A$ of beans as illustrated in FIG. 6 corresponding to the situation where $M_A$ is greater than $M_A$.

These discrete successive times of the pre-determined recipe $RM_n$ can be pre-defined to provide a final roasting recipe with enough points to be implemented by the roasting apparatus. For example, successive time may differ by about 20 to 40 seconds.

In the above formula, the coefficient D is usually fixed experimentally and can vary depending on the roaster specifications (power, chamber size, type of heater, . . . ) and/or the type of the beans.

In one embodiment, the coefficient D can be set according to the roaster specifications only.

In another embodiment, the coefficient D can be set according to the type of beans. In that case, coefficient D can be set:

- generally at a high level of definition of the beans such as the big common botanical varieties of the beans, e.g. *Arabica* or *Robusta* providing a coefficient $D_A$ when *Arabica* beans are roasted and a coefficient $D_R$ when *Robusta* beans are roasted, or the usual origins, e.g. Colombia, Ethiopia, . . . .
- or more precisely for each type of beans Cn by defining the corresponding coefficient $D_n$ specifically adapted to this type of beans with more precise criteria than the two general origins.

Based on the obtained type of beans (*Arabica, Robusta* or $C_n$) introduced in the chamber, the control system is configured to get access to the coefficient $D_n$ corresponding to that type of beans.

Preferably, the coefficient D is set according to the roaster specifications and the type of beans.

In absence of information about the roaster or the type of beans or the further use, by default, the coefficient D equals 1.

In a further step, this new determined roasting recipe $Rm_n$ adapted to the quantity $m_n$ of coffee $C_n$ part of the blend can be used to determine the roasting recipe of the customised blend according to above mentioned formulas (I) or (II).

Selection of the Roasting Recipe $Rm_n$ from a Series of Pre-Determined Roasting Recipes $RM_n$ In other modes, the control system can get access to a series of roasting recipes $Rm_{ny}$, $RM_{nyi+1}$, . . . of coffee beans Cn adapted to the roasting of different successive pre-determined quantities $M_{ny}$, $M_{nyi+1}$, respectively of beans of type $C_n$. These temperature profiles are usually defined by experimentation by defining the optimal profile for a pre-determined quantity of beans. It is usually linked to the type of roaster too.

Figure 7:
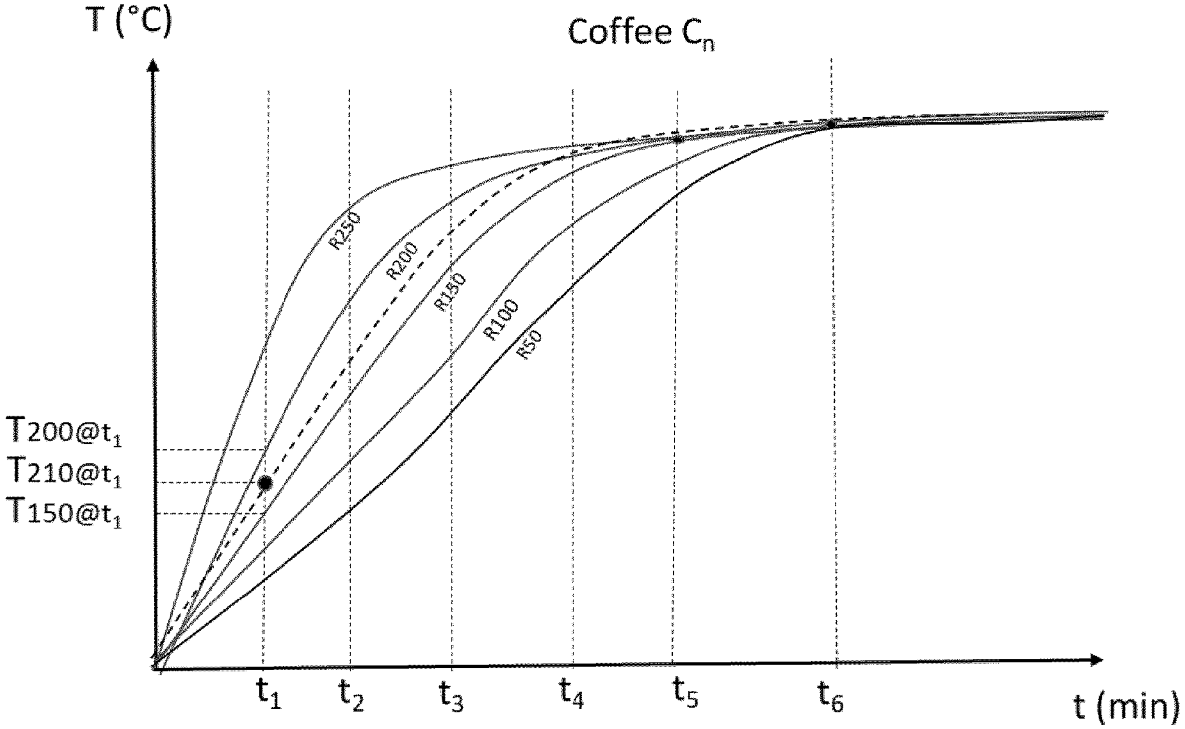
FIG. 7 illustrates the calculation of the roasting profile of specific quantity of a particular type of coffee derived from roasting profiles of pre-determined quantities of said type of coffee beans, FIG. 8 schematically illustrates the use of measuring device to communicate quantities of beans introduced inside the roasting apparatus.

FIG. 7 schematically illustrates the series of roasting recipes $RM_n0$, $RM_n1$, $RM_n2$, $RM_n3$, $RM_n4$ of coffee beans $C_n$ adapted to the roasting of different successive pre-determined quantities $M_n0$, $M_n1$, $M_n2$, $M_n3$, $M_n4$. Each of the illustrated roasting recipes provides the temperature profile to be applied to a corresponding dedicated quantity of beans respectively in function of time. For example, the different pre-determined quantity of beans that are $M_n0$, $M_n1$, $M_n2$, $M_n3$, $M_n4$ can be discrete weights such as: 50 g, 100 g, 150 g, 200 g and 250 g of the same type of beans $C_n$.

If the quantity $m_n$ of beans $C_n$ introduced in the customised blend is identical to one of these pre-determined quantities $M_{ny}$, $M_{nyi+1}$, . . . then the roasting recipe can be directly used in the determination of the roasting recipe of the blend.

If the quantity $m_n$ of beans $C_n$ introduced in the customised blend is different from these pre-determined quantities $M_ny$ the control system can be configured to adapt this roasting profile for the quantity $m_n$ of the beans of type $C_n$ used in the customised blend before determining the roasting profile of the blend, in particular according to one of the below modes.

In one second mode, based on the quantity $m_n$ of coffee beans introduced inside the chamber, the control system is configured to determine the roasting recipe $Rm_n$ adapted to the roasting of the obtained quantity $m_n$ of beans of said identified type $C_n$, by selecting in the series the roasting recipe $RM_{ny}$ corresponding to the pre-determined quantity of beans $C_n$ presenting the smallest difference of quantity $M_n y$ with the obtained quantity $m_n$ used in the blend.

Then this roasting recipe $RM_n y$ adapted to the quantity $m_n$ of coffee $C_n$ part of the blend can be used to determine the roasting recipe of the customised blend according to above formula (I) or (II).

For illustration of the second mode, based on the series of recipes of FIG. 7 to be applied to different pre-determined weights of beans such as: 50 g, 100 g, 150 g, 200 g and 250 g, if the input for the quantity $m_n$ of beans is 210 g, then the processing unit 8 is operable to select the roasting recipe corresponding to the pre-determined quantity of beans 200 g because the smallest difference between 210 and the five pre-determined quantities 50 g, 100 g, 150 g, 200 g, 250 g is the difference between 210 g and 200 g.

In another third mode, based on the quantity $m_n$ of coffee beans introduced inside the chamber, the control system is configured to determine the roasting recipe $Rm_n$ adapted to the roasting of the obtained quantity $m_n$ of beans of said identified type $C_n$, by:

- identifying in the series of roasting recipes the two roasting recipes $RM_n y$ and $Rm_{ny}+1$ adapted to the roasting of two successive pre-determined quantities $M_n y$ and $M_n y+1$ of beans respectively, wherein the quantity $m_n$ is comprised between said two successive pre-determined quantities $M_n y$ and $M_n y+1$,
- from said two identified roasting recipes $RM_n y$ and $Rm_n y+1$, determining the temperature $Tm_{n@t1}$, $Tm_{n@t2}$ . . . to be applied to the obtained quantity $m_n$ of beans $C_n$ at each of said discrete successive times $t_1$, $t_2$, . . . as follows:

$$Tm_{n@ti} = TM_n y_{@ti} + \left[(TM_n y + 1 @ ti - TM_n y @ ti) \cdot E \cdot (m_n - M_n y)/(M_n y + 1 - M_n y)\right] \text{ with } E \leq 1.$$

Then the temperatures $Tm_{n@t1}$, $Tm_{n@t2}$ . . . adapted to the quantity $m_n$ of coffee $C_n$ part of the blend can be used to determine the roasting recipe of the customised blend according to above formula (I) or (II).

For example, based on FIG. 7, if the obtained quantity $m_n$ is 160 g, then roasting recipes $R_{150}$ and $R_{200}$ corresponding respectively to 150 g and 200 g of coffee beans of type $C_n$ are identified.

In a second step, at discrete successive times $t_1$, $t_2$, . . . , $t_6$, the temperature $Tm_n$ to be applied to the obtained quantity $m_n$ of beans $C_n$ at each of said discrete successive times $t_1$, $t_2$, . . . $t_6$ is calculated from the roasting recipes $R_{150}$ and $R_{200}$ as follows:

$$Tm_n @ ti = T150_{@ti} + \left[(T200_{@ti} - T150_{@ti}) * E * (160 - 150)/(200 - 150)\right] \text{ with } E \leq 1.$$

The calculation is reproduced at each time $t_1$ to $t_6$ determining the full roasting recipe $Rm_n$ for the quantity $m_n$ of beans.

These discrete successive times of the pre-determined recipe $RM_n$ can be pre-defined to provide a final roasting recipe with enough points to be implemented by the roasting apparatus. For example, successive time may differ by about 20 to 40 seconds.

In the above formula, the coefficient E is usually fixed experimentally and can vary depending on the roaster specifications (power, chamber size, type of heater, . . . ) and/or the type of the beans.

In one embodiment, the coefficient E can be set according to the roaster specifications only.

In another embodiment, the coefficient E can be set according to the type of beans. In that case, coefficient E can be set:

- generally at a high level of definition of the beans such as the big common botanical varieties of the beans, e.g. *Arabica* or *Robusta* providing a coefficient $E_A$ when *Arabica* beans are roasted and a coefficient $E_R$ when *Robusta* beans are roasted, or the usual origins, e.g. Colombia (coefficient $E_C$), Ethiopia (coefficient $E_E$),
- or more precisely for each type of beans $C_n$ by defining the corresponding coefficient $E_n$ specifically adapted to this type of beans with more precise criteria than the two general origins.

Based on the obtained type of beans (*Arabica, Robusta* or $C_n$) introduced in the chamber, the control system is configured to get access to the coefficient En corresponding to that type of beans.

Preferably, the coefficient E is set according to the roaster specifications and the type of beans.

In absence of information about the roaster or the type of beans or the further use, by default, the coefficient E equals 1.

In a further step, this new determined roasting recipe $Rm_n$ adapted to the quantity mn of coffee Cn part of the blend can be used to determine the roasting recipe of the customised blend according to above mentioned formulas (I) or (II).

In another fourth mode, based on the quantity $m_n$ of coffee beans introduced inside the chamber, the control system is configured to determine the roasting recipe $Rm_n$ adapted to the roasting of the obtained quantity $m_n$ of beans of said identified type $C_n$, by:

- identifying in the series of roasting recipes the two roasting recipes $RM_n y$ and $Rm_n y+1$ adapted to the roasting of two successive pre-determined quantities $M_n y$ and $M_n y+1$ of beans respectively, wherein the quantity mn is comprised between said two successive pre-determined quantities $M_n y$ and $M_n y+1$,
- from said two identified roasting recipes $RM_n y$ and $Rm_n y+1$, determining the temperature $Tm_{n@t1}$, $Tm_{n@t2}$ . . . to be applied to the obtained quantity mn of beans at each of said discrete successive times $t_1$, $t_2$, . . . as follows:

if $m_n$ is closer to $M_n y$, then $Tm_n @ti = TM_n y @ti + [(TM_n y+1 @ti - TM_n y @ti) \cdot E \cdot (m_n - M_n y)/(M_n y+1 - M_n y)]$ if $m_n$ is closer to $M_n y+1$, then $Tm_n @ti = TM_n y+1 @ti - [(TM_n y+1 @ti - TM_n y @ti) \cdot E \cdot (M_n y+1 - m_n)/(M_n y+1 - M_n y)]$ with E≤1, Then the temperatures $Tm_{n@t1}$, $Tm_{n@t2}$ . . . adapted to the quantity $m_n$ of coffee $C_n$ part of the blend can be used to determine the roasting recipe of the customised blend according to above formula (I) or (II).

For example, based on FIG. 7, if the obtained quantity $m_n$ is 160 g, then then roasting recipes $R_{150}$ and $R_{200}$ corresponding respectively to 150 g and 200 g of coffee beans of type $C_n$ are identified. Then, since 160 g is closer to 150 g, the temperature $Tm_n$ to be applied to said 160 g of beans $C_n$ at each of discrete successive times $t_1, t_2, \ldots t_6$ is calculated from these roasting recipes $R_{150}$ and $R_{200}$ as follows:

$$T160_{@ti} = T150_{@ti} + \left[(T200_{@ti} - T150_{@ti}) * E * (160 - 150)/(200 - 150)\right] \text{ with } E \leq 1.$$

But, if the obtained quantity $m_n$ had been 180 g, $m_n$ would be closer to 200 g and the temperature to be applied at ti would have been $T_{200_{@ti}}-[(T_{200_{@ti}}-T_{150_{@ti}})*E*(200-180)/(200-150)]$.

The coefficient E is defined in the same manner as in the third mode.

Generally, in the step of determining the recipe $R_{blend}$ to be applied to a customised blend of different coffee beans introduced inside the chamber from the quantities $m_A$, $m_B$, . . . and roasting recipes $RM_A$, $RM_B$, . . . of said different types of coffee beans $C_A$, $C_B$, . . . any of the different above described modes enabling the determination of roasting recipes $Rm_A$, $Rm_B$, can be used. In particular, different modes can be used for different coffees.

FIG. 8 illustrates the use of a measuring device 3 to communicate quantities of beans introduced inside the roasting apparatus to the processing unit of the control system.

The measuring device 3 is connected to the processing unit 8 of the roasting apparatus 10.

When a blend of coffees is customised, different coffees are introduced inside the chamber 1 positioned in relation to the measuring device 3. For example if the measuring device is a scale, the chamber 1 can be positioned on the scale.

In a step 1, a first quantity of coffee $C_A$ is introduced inside the chamber. The scale detects the introduction of beans and provides the information to the control system 80 of the apparatus. The control system can be configured to display a message through the user interface 6 to require the operator enters the identification of the beans $C_A$. In the operation of identification, the operator can input the type of the beans like a SKU reference, a trademark or a more general level description like *Arabica* green beans or *Robusta* pre-roasted beans.

Then or simultaneously, in step 2, the measuring device provides the quantity $m_A$ of beans $C_A$ present in the chamber. A further step, not illustrated, can happen where the control system asks the operator to confirm the introducing of beans $C_A$ in the chamber is finished.

In step 3, the scale detects the introduction of beans again and provides the information to the control system 80 of the apparatus, which implements the steps 4 and 5 identical the previous steps 1 and 2 of requiring identification of the beans being introduced, here $C_B$, and getting access to the measured quantity $m_B$ of said beans $C_B$ in the chamber.

In step 6, the chamber 1 is positioned inside the apparatus 10 finishing the steps of obtaining the identification and quantities of the different coffee beans part of the customised blend.

Alternative implementations can be used: the measuring device can be part of the chamber which does not require the withdrawal of the chamber form the apparatus.

Usually the measured quantity is the weight of the beans. Alternatively, it can be the volume. If the quantity provided by the measuring device is a volume and not a weight, the weight can be deduced indirectly from an average density of coffee beans or more preferably, the identification of the nature of the beans provides access to the exact density of said beans enabling the calculation of the weight of beans introduced in the chamber.

Figure 9:
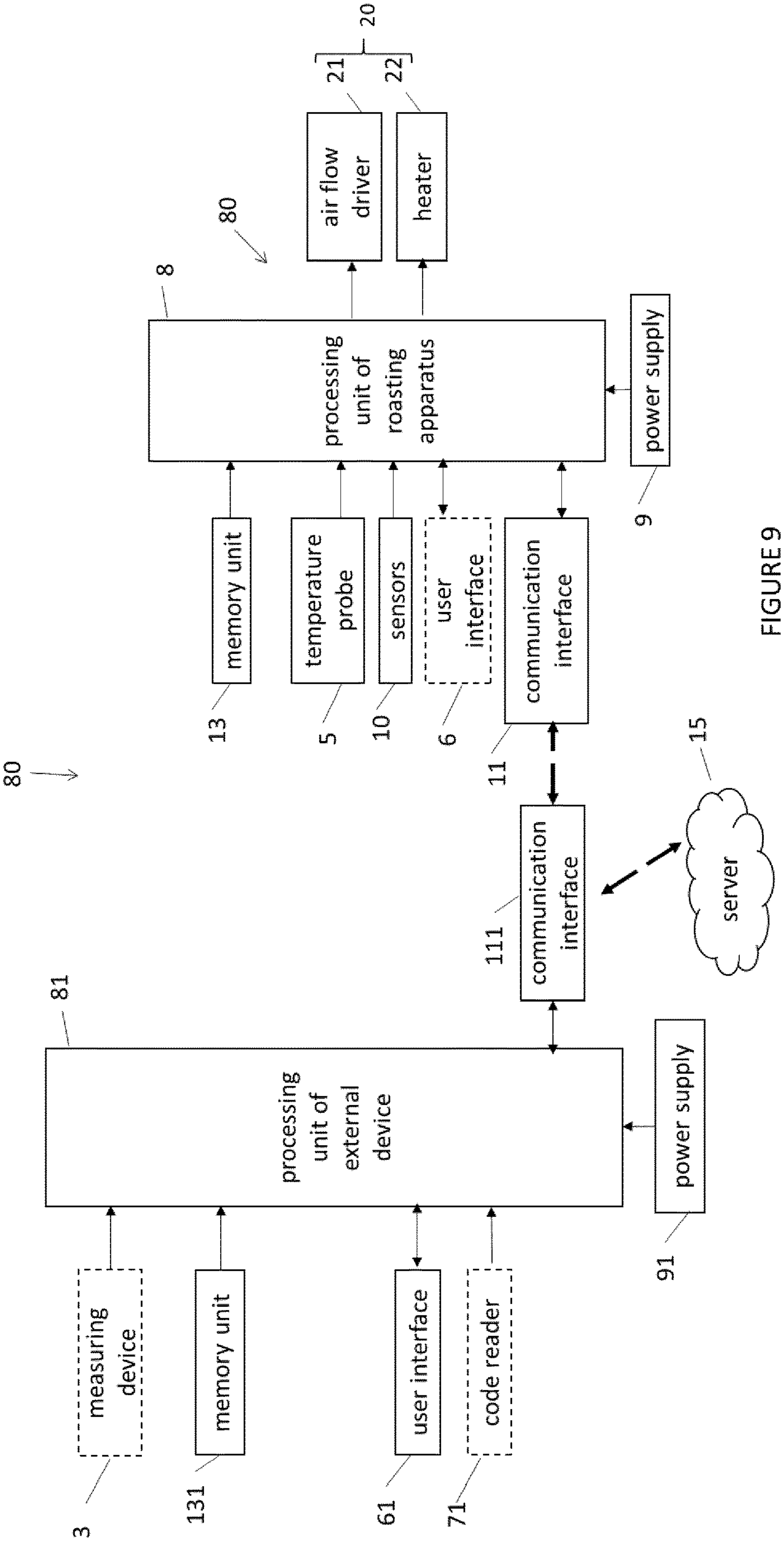
FIG. 9 shows the block diagram an alternative embodiment of the control system of the apparatus of FIG. 1.

FIG. 9 illustrates the block diagram of an alternative embodiment of the control system 80 of a roasting apparatus 1.

In this embodiment, the control system is implemented through two processing units, one processing unit 8 being part of the roasting apparatus 1 and the other processing unit 81 being part of an external command device like a tablet or a smartphone.

Figure 2:
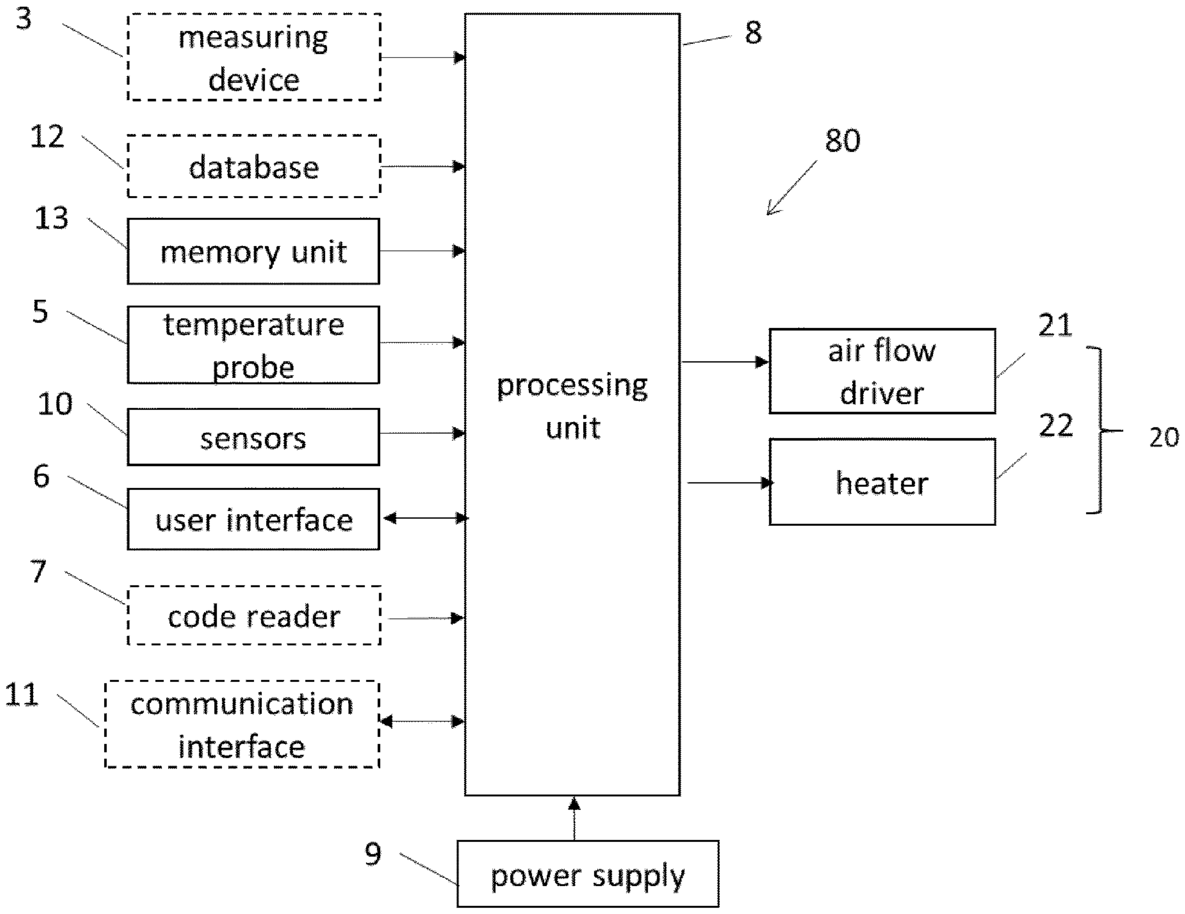
FIG. 2 shows a block diagram of a control system of the apparatus according to FIG. 1.

The processing unit 8 of the roasting apparatus can provide less functions than the processing unit illustrated in FIG. 2 and is limited essentially to the core functions of the roasting apparatus that is applying a determined recipe by control of the air flow driver and the heater. The presence of a user interface can even be optional.

The determined roasting recipe for the new customized blend can be provided through the communication interface 11 establishing communication with the communication interface 111 of the processing unit 81 of the external device. The processing unit 81 is configured to receive input about the types and quantities of the beans introduced inside the chamber of the roasting apparatus through the user interface 61 of the external device and/or through a measuring device 3 and/or through a code reader 71.

The processing unit 81 of the external device is configured to execute the program enabling the determination of the roasting recipe of the blend, this program being stored in the memory unit 131 of the processing unit or accessible in a remote server 15 through the communication interface 111. Once the roasting recipe of the blend is determined, it can be communicated to the processing unit 8 of the roasting apparatus 1 for execution of the roasting operation.

The present invention provides the advantage of enabling the rapid and easy determination of the roasting recipe of a customized blend from the at least one existing recipe of each of the coffee beans part of the blend. Once at least one roasting recipe of a type of beans is accessible, it becomes possible to use this existing roasting recipe to determine the roasting recipe of a blend comprising said type of beans.

Another advantage is that, when the roasting recipes of existing commercialized blends of coffee beans are defined by this method and the sourcing of one type of the beans of the blend is no more possible for various reasons, it becomes possible to replace this type of beans by another one and to define rapidly and automatically the new roasting recipe of the blend based on the recipe of this new type of coffee beans and the recipes of the other types of beans already present in the blend.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS

| | |
|---|---|
| roasting apparatus | 10 |
| chamber | 1 |
| bottom opening | 11 |
| top opening | 12 |
| heating device | 2 |
| air flow driver | 21 |
| heater | 22 |
| passage | 23 |
| measuring device | 3 |
| housing | 4 |
| air outlet hole | 41 |
| air inlets | 42 |
| temperature probe | 5 |
| user interface | 6, 61 |
| code reader | 7, 71 |
| processing unit | 8, 81 |
| control system | 80 |
| power supply | 9, 91 |
| sensor | 10 |
| communication interface | 11, 111 |
| database | 12 |
| memory unit | 13, 131 |
| coffee beans | 14 |
| server | 15 |

The invention claimed is:

1. A method to determine a roasting recipe for roasting a customised blend of coffee beans introduced in a chamber of a roasting apparatus, the recipe providing a temperature to be applied at discrete successive times respectively, the method comprising the steps of:

obtaining for each type of coffee beans comprised in the customised blend at least:

a type of the each type of coffee beans, and a quantity $m_n$ of the each type of coffee beans introduced in the chamber, and based on the each type of coffee beans comprised in the blend, getting access at least to:

roasting recipes of the each type of coffee beans respectively, each of the roasting recipes being adapted to the roasting of one pre-determined quantity of beans of same type and providing the temperatures to be applied at discrete successive times respectively, and temperature adaptation factors of the each type of coffee beans respectively of the customised blend, and based on the quantities $m_n$ of the each type of coffee beans and the roasting recipes and temperature adaptation factors, determining the roasting recipe to be applied to said customised blend of coffee beans introduced inside the chamber.

2. The method according to claim 1, wherein the roasting recipe to be applied to the customised blend of coffee beans is determined by at least the following steps:

for each type of coffee beans respectively selecting or determining the roasting recipe adapted to roasting of an obtained quantity of beans of the each type of the roasting recipe providing the temperature respectively to be applied at time respectively, and from the selected and/or determined roasting recipes and from the temperature adaptation factors and based on the obtained quantities of beans of each type introduced inside the chamber, determining the temperature to be applied to the customised blend of beans at each of discrete successive times respectively according to following formula (I):

$$T_{blend@t_i} = \sum_{n=A}^{N} f_n \cdot K_n \cdot T_{m_n@t_i} \quad \text{(I)}$$

wherein n corresponds to all the types of coffee beans $C_A$ to $C_N$ present in the customised blend and $f_n$ represents a fraction in weight of coffee beans of type $C_n$ in the customised blend of coffee beans.

3. The method according to claim 2, wherein:

in at least two of the selected and/or determined roasting recipes of coffees, the roasting recipes providing temperatures to be applied at discrete successive times, at least a part of the discrete successive times are set differently, and from the selected and/or determined roasting recipes for each coffee of the customised blend, interpolated roasting recipes curves are determined by interpolating curves of the roasting recipes so that all the selected and/or determined roasting recipes provide the temperatures to be applied at the discrete successive times.

4. The method according to claim 2, comprising the steps of:

selecting or determining:

the roasting recipes of the each type of coffee beans of different types respectively, each roasting recipe being adapted to the roasting of the quantity of beans of same type and providing the temperatures to be applied at discrete successive times up to a final time tfinal n ft respectively, and the final time being set differently in at least two of the roasting recipes of different types, and getting access to:

time adaptation factors for the each type of coffee beans respectively, and determining the roasting recipe to be applied on the customised blend of coffee beans by implementing the following steps:

based on obtained roasting recipes, obtaining the final times of each type of coffee beans part of the customised blend, and sorting obtained final times comprising the final times of the each type of coffee beans in an ascending order from a lowest final time $t_{final\ low}$ up to a highest high $t_{final\ high}$;

for times inferior or equal to the lowest final time $t_{final\ low}$, determining the roasting recipe to be applied to the customised blend of coffee beans introduced inside the chamber according to formula (I), for times superior to the lowest final time $t_{final\ low}$, determining the roasting recipe to be applied to the customised blend of coffee beans introduced inside the chamber by setting temperatures to be applied at calculated times $t_y$, each of said calculated times ty being calculated from each corresponding obtained final time $t_{final\ y}$, from t $t_{final\ low+1}$ up to $t_{final\ high}$, as follows:

$t_y = t_{final\ y-1} + [(t_{final\ y} - t_{final\ y-1}) * \Sigma(f_n * S_n)]$ with n' corresponding to the coffees presenting a final time superior or equal to $t_{final\ y}$, up to $t_{final\ high}$, temperature being determined at each of the calculated time $t_y$ from the roasting recipes $Rm_{n'}$ of all the coffee beans $C_{n'}$ presenting a final time superior or equal to $t_{final\ y}$, according to following formula (II):

$$T_{blend@ty} = \sum_{n'} f_{n'} \cdot K_{n'} \cdot T_{m_{n'}@t_y} \quad (II)$$

at $t_{final\ high}$:

if only one coffee Cz presents a roasting recipe that presents a final time equal to final high, then the temperature of the blend is the temperature of the roasting recipe of a quantity mz of the coffee Cz part of the blend at said final time: $T_{blend@final\ high} = T_{mz@tfinal\ z}$, or if at least two coffees present roasting recipes that present the same final time equal to $t_{final\ high}$, then the temperature of the customised blend is determined according to formula (II).

5. The method according to claim 2, comprising the steps of:

selecting and/or determining the roasting recipes of the each types of coffee beans of different types respectively, each recipe being adapted to the roasting of the quantity of beans of same type and providing the temperatures to be applied at discrete successive times up to a final time respectively, and said final time set differently in at least two of the roasting recipes of different types, and determining the roasting recipe to be applied on the customised blend of coffee beans by implementing the following steps:

based on the selected and/or determined roasting recipes, obtaining the final times of the each type of coffee beans part of the customised blend, and identifying a lowest final time $t_{final\ low}$, limiting the roasting recipe to be applied to the customised blend of coffee beans introduced inside the chamber to times inferior to the lowest final time low, and determining the roasting recipe to be applied to the customised blend of coffee beans introduced inside the chamber according to formula (I).

6. The method according to claim 2, comprising the steps of:

selecting and/or determining the roasting recipes of the each type of coffee beans of different types respectively, each recipe being adapted to the roasting of the quantity of beans of same type and providing the temperatures to be applied at discrete successive times up to a final time respectively, and the final time set differently in at least two of the roasting recipes of different types, and determining the roasting recipe to be applied on the customised blend of coffee beans by implementing the following steps:

based on the selected and/or determined roasting recipes, obtaining the final times of the each type of coffee beans part of the customised blend, and identifying a lowest final time $t_{final\ low}$, for times inferior or equal to the lowest final time $t_{final\ low}$, determining the roasting recipe to be applied to the customised blend of coffee beans introduced inside the chamber according to formula (I), for times superior to the lowest final time $t_{final\ low}$, determining the roasting recipe to be applied to the customised blend of coffee beans introduced inside the chamber by setting temperatures to be applied at each $t_{final\ n}$ as follows:

up to $t_{final\ high-1}$, temperature being determined at each of the time $t_{final\ high-1}$ from the roasting recipes $Rm_{n'}$ of all coffee beans $C_{n'}$ presenting a final time superior or equal to $t_{final\ y}$, according to following formula (III):

$$T_{blend@t_{finaln}} = \sum_{n'} f_{n'} \cdot K_{n'} \cdot T_{m_{n'}@t_{final\,n}} \quad (II)$$

at $t_{final\ high}$:

if only one coffee Cz presents a roasting recipe that presents a final time equal to final high, then the temperature of the customised blend is the temperature of the roasting recipe of the quantity mz of the coffee Cz part of the blend at the final time: $T_{blend@final\ high} = T_{mz@tfinal\ z}$, or if at least two coffees present roasting recipes that present the same final time equal to $t_{final\ high}$, then the temperature of the customised blend is determined according to formula (III).

7. The method according to claim 2, comprising the steps of:

selecting and/or determining the roasting recipes of the each type of coffee beans of different types respectively, each recipe being adapted to the roasting of the quantity of beans of same type and providing the temperatures to be applied at discrete successive times up to a final time respectively, and the final time set differently in at least two of the roasting recipes of different types, and getting access to time adaptation factors for each type of coffee beans respectively, and determining the roasting recipe to be applied on the customised blend of coffee beans by implementing the following steps:

based on the selected and/or determined roasting recipes, obtaining the final times of the each type of coffee beans part of the customised blend, and identifying a lowest final time $t_{final\ low}$, for times inferior or equal to the lowest final time $t_{final\ low}$, determining the roasting recipe to be applied to said blend of coffee beans introduced inside the chamber according to formula (I), above the lowest final time $t_{final\ low}$, calculating one time tfinal global from all the final times $t_{finaln}$ of all coffee beans $C_n$ part of the customised blend, as follows:

$$t_{final\ global} = \Sigma(fn * S_n * t_{final\ n})]$$

limiting the roasting recipe to be applied to the customised blend of coffee beans introduced inside the chamber to the time $t_{final\ global}$, and determining the roasting recipe to be applied at the time tfinal global to the customised blend of coffee beans introduced inside the chamber according to formula (I).

8. The method according to claim 2, comprising the steps of:

getting access, for at least one coffee part of the customised blend, to one roasting recipe of coffee beans, the roasting recipe being adapted to the roasting of one pre-determined quantity of beans, for the at least one coffee part of the customised blend, determining the roasting recipe adapted to the roasting of the obtained quantity of coffee beans of the type from the one accessible roasting recipe adapted to the roasting of one pre-determined quantity of coffee beans of type and providing the temperatures to be applied at discrete successive times $t_i$ respectively, as follows:

$$\text{if } mn > Mn, \text{ then } Tm_{n@ti} = T_{Mn@ti} + \left[TM_n@ti \cdot D \cdot (mn - Mn)/Mn\right] \quad \text{(IIIa)}$$

$$\text{if } mn < Mn, \quad \text{(IIIb)}$$

$$\text{then } Tm_{n@ti} = T_{Mn@ti} - \left[TM_n@ti \cdot D \cdot (Mn - mn)/Mn\right] \text{ with } D \leq 1$$

from the determined roasting recipe determining the temperature to be applied to the customised blend of beans at each of the discrete successive times according to formula (I) or (II).

9. The method according to claim 2, comprising the steps of:

getting access, for at least one coffee part of the customised blend, to at least one accessible series of roasting recipes adapted to the roasting of different successive pre-determined quantities of beans of type respectively and to the pre-determined quantities, and for the at least one coffee part of the customised blend, determining a determined roasting recipe adapted to the roasting of the obtained quantity of beans of the type by selecting one of the recipes of the at least one accessible series of roasting recipes, the selecting one of the recipes comprising identifying the roasting recipe adapted to the roasting of a pre-determined quantity of beans, said pre-determined quantity of beans presenting a smallest difference of quantity with the obtained quantity, from the determined roasting recipe, determining the temperature to be applied to the customised blend of beans at each of said discrete successive times according to formula (I) or (II).

10. The method according to claim 2, comprising the steps of:

getting access, for at least one coffee part of the customised blend, to at least one accessible series of roasting recipes adapted to the roasting of different successive pre-determined quantities of beans of type respectively and to the pre-determined quantities, and for the at least one coffee part of the customised blend, determining a determined roasting recipe adapted to the roasting of the obtained quantity of beans of the type by:

identifying in the at least one accessible series of roasting recipes two accessible roasting recipes adapted to the roasting of two successive pre-determined quantities of beans respectively, wherein the quantity is comprised between the two successive pre-determined quantities, from the two identified roasting recipes, the roasting recipes providing the temperatures respectively applied at discrete successive times determining the temperature to be applied to the obtained quantity of beans at each of the discrete successive times as follows:

$$Tm_n@ti = TM_ny@ti + [(TM_ny + 1@ti - TM_ny@ti) \cdot E \cdot (m_n - M_ny)/(M_ny + 1 - M_ny)] \text{ with } E \leq 1, \quad \text{(IV)}$$

from the determined roasting recipe determining the temperature to be applied to the customised blend of beans at each of the discrete successive times according to formula (I) or (II).

11. The method according to claim 2, comprising the steps of:

getting access, for at least one coffee part of the customised blend, to at least one accessible series of roasting recipes adapted to the roasting of different successive pre-determined quantities of beans of type respectively and to the pre-determined quantities, and for the at least one coffee part of the customised blend, determining a determined roasting recipe adapted to the roasting of the obtained quantity of beans of the type by:

identifying in the at least one accessible series of roasting recipes two identified accessible roasting recipes adapted to the roasting of two successive pre-determined quantities of beans respectively, wherein the quantity $m_n$ is comprised between these two successive pre-determined quantities, from the two identified accessible roasting recipes, the identified accessible roasting recipes providing the temperatures respectively applied at discrete successive times determining the temperature to be applied to the obtained quantity of beans at each of the discrete successive times as follows:

if $m_n$ is closer to $M_ny$, then $Tm_n@ti=TM_ny@ti+[(TM_ny+1@ti-TM_ny@ti)\cdot E\cdot(m_n-M_ny)/(M_ny+1-M_ny)]$ if $m_n$ is closer to $M_ny+1$, then $Tm_n@ti=TM_ny+1@ti-[(TM_ny+1@ti-TM_ny@ti)\cdot E\cdot(M_ny+1-m_n)/(M_ny+1-M_ny)]$ with $E\leq 1$, from the determined roasting recipe determining the temperature to be applied to the customised blend of beans at each of the discrete successive times according to formula (I) or (II).

* * * * *